(12) United States Patent
Tamai et al.

(10) Patent No.: US 9,127,404 B2
(45) Date of Patent: *Sep. 8, 2015

(54) USED PAPER RECYCLING APPARATUS AND ITS CONSTITUENT DEVICES

(75) Inventors: Shigeru Tamai, Osaka (JP); Yuji Koyama, Osaka (JP)

(73) Assignee: SEED COMPANY LIMITED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,580

(22) Filed: Jul. 13, 2012

(65) Prior Publication Data

US 2012/0279671 A1 Nov. 8, 2012

Related U.S. Application Data

(63) Continuation of application No. 11/524,959, filed on Sep. 22, 2006, now Pat. No. 8,313,616.

(30) Foreign Application Priority Data

Sep. 22, 2005 (JP) .................................. 2005-276794

(51) Int. Cl.
*D21F 1/02* (2006.01)
*D21F 9/00* (2006.01)
(Continued)

(52) U.S. Cl.
CPC .. *D21F 1/02* (2013.01); *D21B 1/32* (2013.01); *D21F 9/00* (2013.01); *D21F 9/02* (2013.01)

(58) Field of Classification Search
CPC ................ D21F 9/00; D21F 9/02; D21F 1/02
USPC ........................................................... 162/315
See application file for complete search history.

(56) References Cited

U.S. PATENT DOCUMENTS 1,973,722 A * 9/1934 Nash ............................ 162/147
2,112,562 A 3/1938 Fisher
2,148,613 A 2/1939 Frost
(Continued)

FOREIGN PATENT DOCUMENTS

GB 2 408 518 A 6/2005
JP 6-134331 A 5/1994
JP 8-60570 A 3/1996

OTHER PUBLICATIONS

"The Story of the Eagle Paper Machine", Canammachinery, downloaded online from www.canammachinery.com on Jul. 20, 2009.
(Continued)

*Primary Examiner* — Anthony Calandra
(74) *Attorney, Agent, or Firm* — Cheng Law Group, PLLC

(57) ABSTRACT

A used paper recycling apparatus capable to be installed in small office or general household, friendly to environment and low in running cost, and assuring high confidentiality. A used paper recycling apparatus comprising a pulp making section for crushing and beating used paper and making into pulp, a paper making section for recycling paper by making used paper pulp from the pulp making section, and a control section for driving and controlling by interlocking the pulp making section and paper making section, which are incorporated in a furniture size apparatus case, in which the pulp making section includes a crushing unit for stirring and grinding the used paper, and a beating unit for beating the crushed used paper from the crushing unit, and the crushing unit and beating unit are circulating the used paper pulp.

5 Claims, 16 Drawing Sheets

(51) Int. Cl.
   *D21F 9/02*   (2006.01)
   *D21B 1/32*   (2006.01)

(56) References Cited

U.S. PATENT DOCUMENTS

| | | |
|---|---|---|
| 3,305,180 A | 2/1967 | Tomlinson |
| 3,357,880 A | 12/1967 | Curtis |
| 4,141,388 A | 2/1979 | Romanski et al. |
| 6,712,931 B1 | 3/2004 | Gron et al. |
| 2002/0152630 A1 | 10/2002 | Lindsay et al. |
| 2007/0006987 A1 | 1/2007 | Brambilla |
| 2007/0113994 A1 | 5/2007 | Ogunjimi |

OTHER PUBLICATIONS

Smook, Handbook for Pulp and Paper Technologists, 1992, Angus Wilde Publications, 2nd edition, chapters 14-18 and 23.
Google Definition of "Spread", downloaded online on May 6, 2010.

* cited by examiner

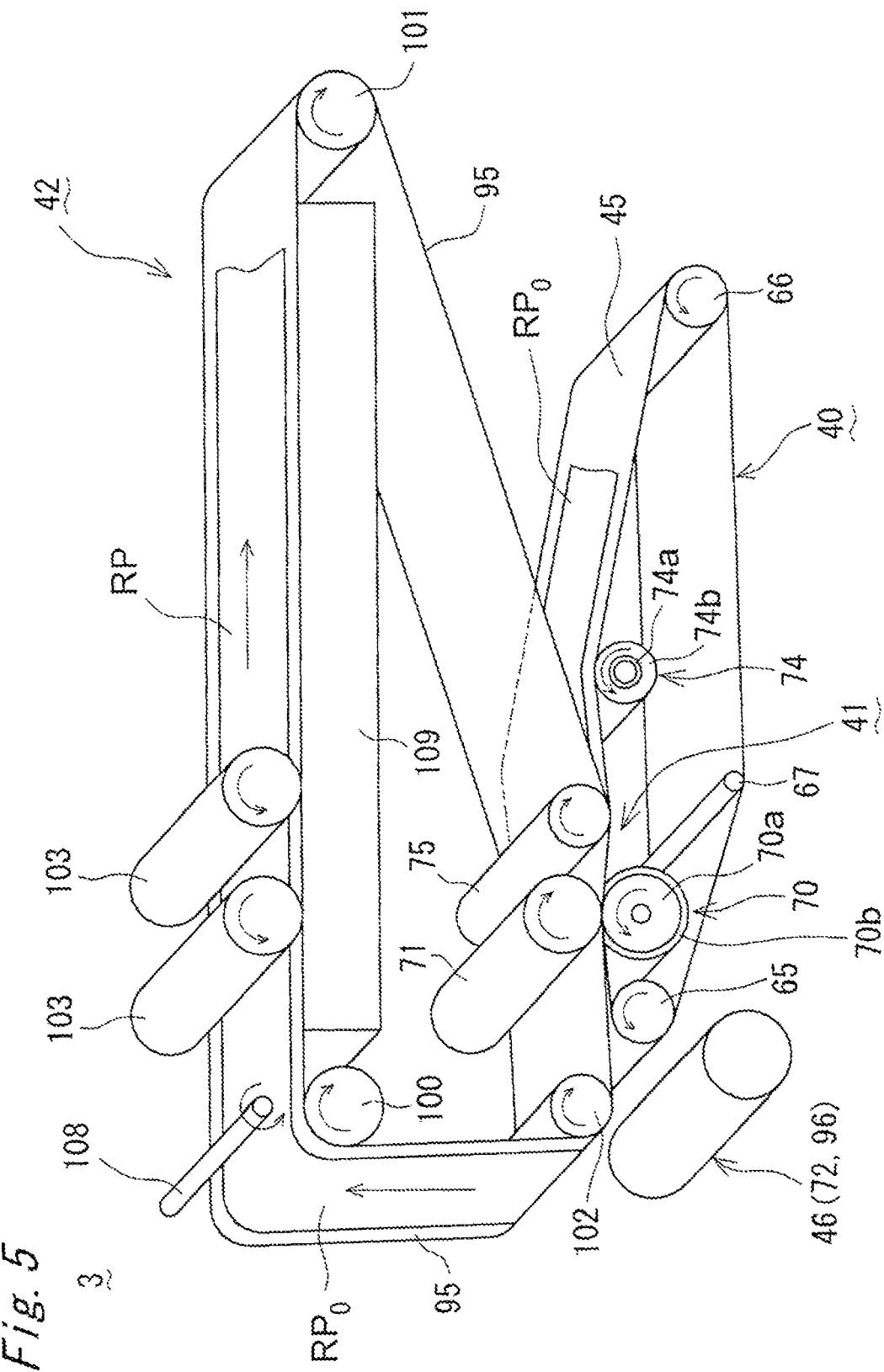

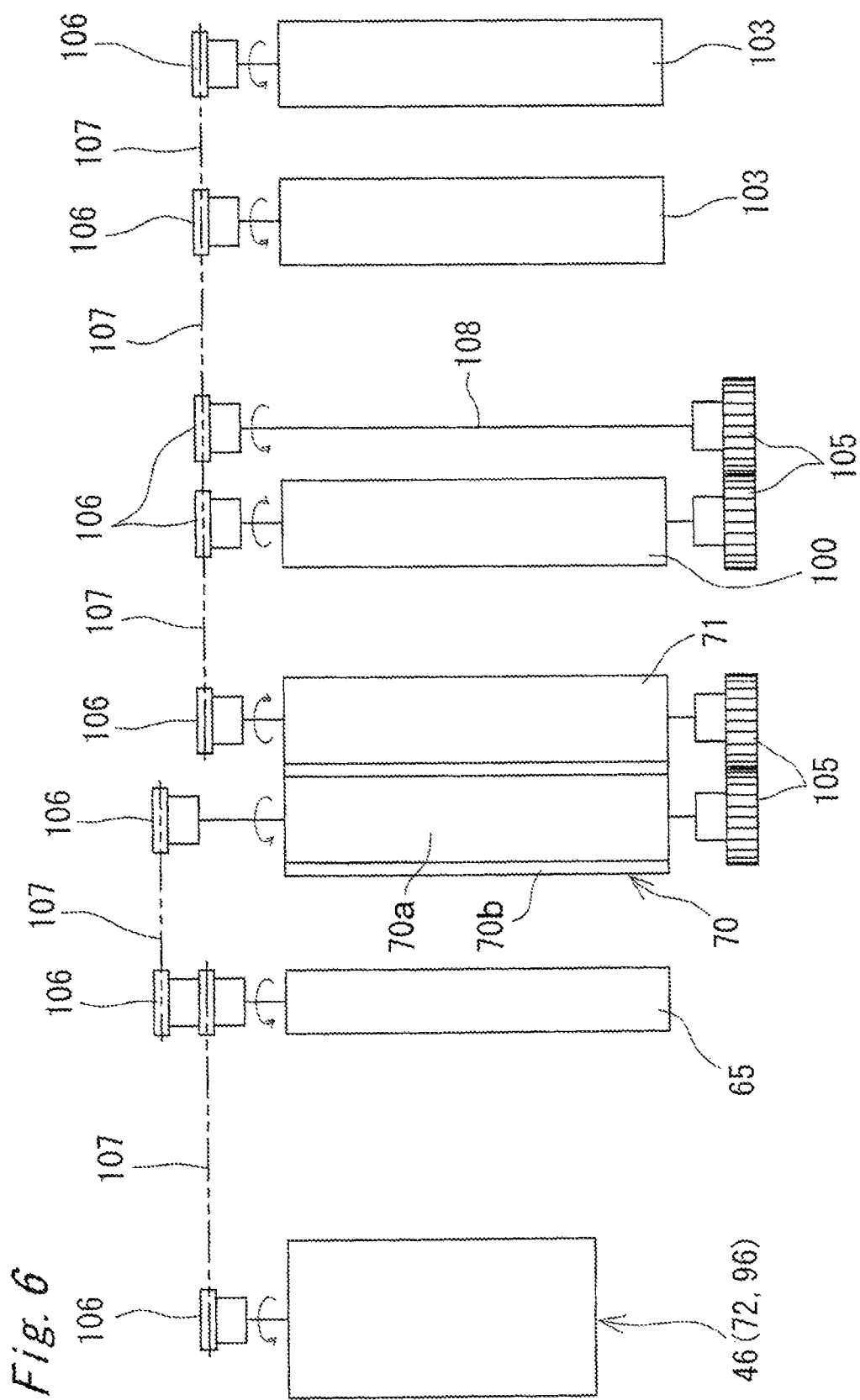

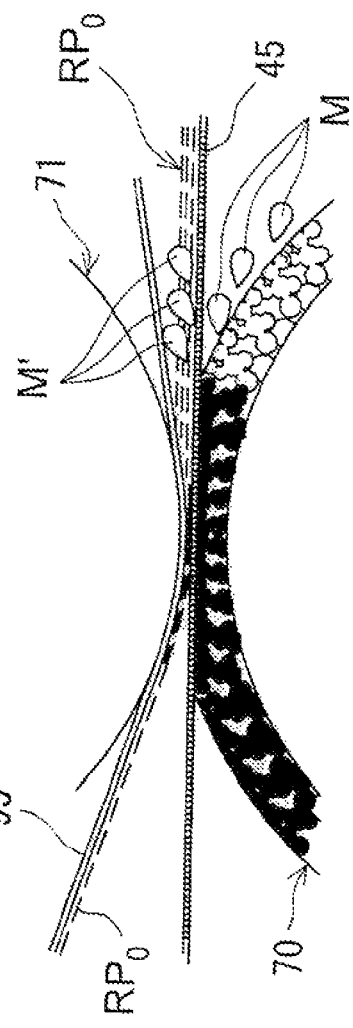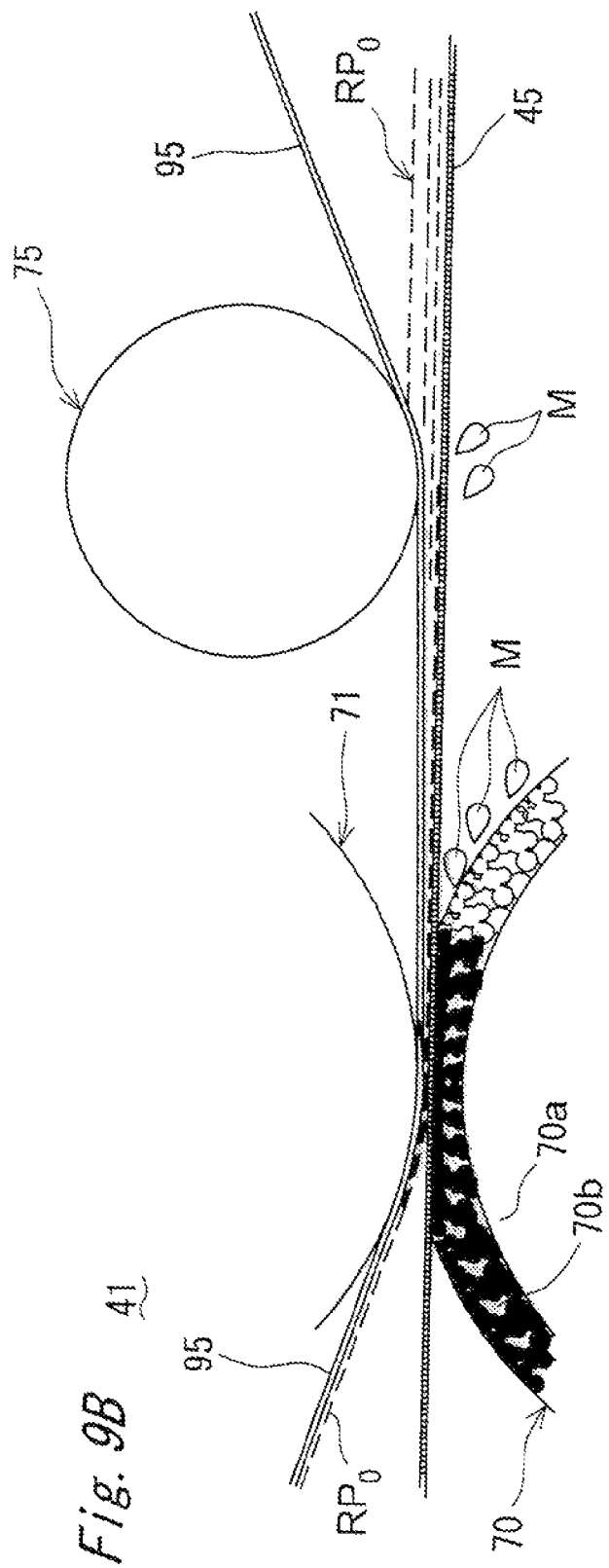

USED PAPER RECYCLING APPARATUS AND ITS CONSTITUENT DEVICES

CROSS-REFERENCE TO RELATED APPLICATIONS

This application is a Continuation Application of patent application Ser. No. 11/524,959, filed on Sep. 22, 2006 now U.S. Pat. No. 8,313,616, which is based on Japanese Application No. 2005-276794, filed Sep. 22, 2005, the entire contents of which are hereby incorporated by reference.

BACKGROUND OF THE INVENTION

1. Field of the Invention

The invention relates to a used paper recycling apparatus, and its pulp manufacturing device, pulp supplying device, and dewatering device, and more particularly to a used paper recycling apparatus for processing the used paper into recycled paper, at the site of origin of used paper, without discarding the used paper.

2. Description of the Related Art

Government offices, private companies, and general household are producing tons of used paper every day. The used paper is discarded as waste matter or refuse, incinerated and disposed.

On the other hand, from the global need of effective use of limited resources on earth, various technologies are developed for recycling the used paper without discarding.

These used paper recycling technologies are mostly employed and practiced in the paper making industry, and used paper recycling facilities require, like the usual paper making facilities, a vast factory land, a tremendous investment, and a huge quantity of water and chemicals used in paper making in order to recycle paper at high speed, massive quantity, and high quality.

Used paper, recycling also needs human labor for collection of used paper, and this used paper collection involves many problems, including mixing of foreign matter by many collection workers, improper sorting of paper due to lack of knowledge about recycling, and failure of removal of matter to be avoided, and if used paper is collected, final sorting or cleaning by professional workers should be required to achieve 100% as recycled paper. Further, confidential documents are not collected but are incinerated, and the recycling efficiency is not enough.

To solve these problems in used paper recycling, a technology for recycling the used paper at the origin is effective, and such apparatus has been developed and proposed in Japanese Patent Application Laid-Open No. H6-134331.

This apparatus is a wet process shredder for tearing used paper and cutting into small pieces while adding a small quantity of water, and shredded chips are sent to a recycling factory and used as material for recycled paper.

Since chips delivered from the wet process shredder are in pulp form and are not readable, recycling of confidential documents may be promoted.

However, the wet process shredder is a huge machine and requires a wide space for installation, and it is usable only in a big office, and it is not suited to small shop or general household limited in space or small in the quantity of used paper. If shredded chips are used as material for recycling, it is applicable only in a large-scale plant, and the recycling cost is high, and it is not economical.

SUMMARY OF THE INVENTION

It is hence a primary object of the invention to present a novel used paper recycling apparatus solving the problems of the prior art.

It is other object of the invention to present a used paper recycling apparatus that can be installed not only in a big office but also in small shop or general household, and is friendly to the environment and low in running cost, and is capable of preventing leak of confidential information or private data, and assuring high confidentiality.

It is another object of the invention to present a pulp making device, a pulp supply device, and a dewatering device for composing such used paper recycling apparatus.

To achieve these objects, a first aspect of the invention is a used paper recycling apparatus comprising a pulp making section for crushing and beating the used paper and making into pulp, a paper making section for recycling paper by making used paper pulp from the pulp making section, and a control section for driving and controlling by interlocking the pulp making section and paper making section, which are incorporated in a furniture size apparatus case, in which the pulp making section includes a crushing unit for stirring and grinding the used paper, and a beating unit for beating the crushed used paper from the crushing unit, and the crushing unit and beating unit are circulating the used paper pulp.

Herein, "Beating" is a process of controlling the length of fibers by fibrillating the pulp by beating and grinding pulp fibers.

Preferred embodiments include the following configurations.

(1) A water circulating system in which water collected by dewatering in the paper making section is circulated and used in the pulp making section.

(2) The driving source of pulp making section and paper making section is the power source driven by a general household alternating-current power source.

(3) Moving means is provided in the apparatus case so as to be movable on the floor of installation.

(4) The crushing unit of the pulp making section includes stirring means for stirring the used paper, and water feeding means for supplying water to the stirring means, and the used paper charged from the inlet of the apparatus case is stirred in the water, and crushed and beaten.

(5) The stirring means includes a stirring tank for storing water supplied from the water feeding means having an inlet for used paper, a stirring impeller rotatably provided in the stirring tank, and a drive motor for rotating and driving the stirring impeller.

(6) A shredder unit is provided at the inlet of the stirring tank, and the used paper charged into the inlet is preliminarily cut by the shredder unit, and is stirred by the stirring impeller.

(7) The water feeding means includes a white water collecting tank for collecting white water filtered and dewatered in the paper making section, and a water feed pump for supplying the water in the white water collecting tank into the stirring means of the pulp making section.

(8) The beating unit of the pulp making section includes a beating tank communicating with the stirring tank of the crushing unit, a beater roller provided rotatably in the beating tank, and a drive motor for rotating and driving the beater roller, and the used paper pulp supplied in the beating tank from the stirring tank is beaten by the beater roller, and is circulated again into the stirring tank.

(9) The beating tank is formed integrally in the lower part of the stirring tank, and the boundary from the stirring tank is opened and closed.

(10) The pulp making section is disposed at the downstream side of the stirring tank, and includes pulp concentration adjusting means for adjusting the concentration of used paper pulp manufactured in the stirring tank, and this pulp concentration adjusting means is composed of a concentration adjusting tank for storing the used paper pulp manufactured in the stirring tank, and water feeding means for concentration adjustment for supplying water into the concentration adjusting tank, and the used paper pulp manufactured in the stirring tank is adjusted in concentration in the concentration adjusting tank by supply of water from the water feeding means for concentration adjustment, and a pulp suspension of specified concentration is prepared.

(11) In the concentration adjusting tank, water from the water feeding means for concentration adjustment is added to the whole volume of used paper pulp manufactured in the stirring tank, and the total volume of used paper pulp and water is adjusted to a specified value, so that a pulp suspension of specified concentration is prepared.

(12) The water feeding means for supplying water into the stirring means also has a function as the water feeding means for concentration adjustment.

(13) The paper making section includes a paper making net conveyor unit for making wet paper from the slurry pulp suspension containing water and used paper pulp sent from the pulp making section, a drying belt conveyor for drying the wet paper from the paper making net conveyor to produce recycled paper, and a dewatering roll unit for squeezing and dewatering the wet paper at the junction of the paper making net conveyor unit and drying belt conveyor unit, and the pulp suspension supplied from the pulp making section is processed, dewatered, and dried.

(14) The paper making net conveyor unit includes a mesh endless belt having a specified width for conveying while processing the pulp suspension, a drive motor for driving and moving the mesh endless belt, and a pulp feed unit for supplying the pulp suspension from the pulp manufacturing section, and by this pulp feed unit, the pulp suspension is supplied and spread uniformly on the surface of the mesh endless belt.

(15) In the pulp feed unit, the mesh endless belt is disposed upward and obliquely to the running direction, and the pulp feed unit has a partition member disposed to contact slidably with the lower side of the mesh endless belt, and a frame body disposed to contact slidably with the upper side of the mesh endless belt, and the pulp suspension supplied in the frame body is uniformly diffused on the surface of mesh endless belt by the retaining action in collaboration of the frame body and partition member, and by the running action of mesh endless belt, it is conveyed together with the mesh endless belt while keeping the width dimension defined by the frame body, and it is designed to dewater by the gravity filtering action by the mesh of the mesh endless belt.

(16) The partition member is a louver structure slidably supporting the lower side of the mesh endless belt, and the flow-down supply position of pulp suspension at the base end side has a flat plate member for supporting the mesh of the mesh endless belt in closed state.

(17) An overflow tank is provided in the frame body, and the pulp suspension supplied in the frame body is once stored in the overflow tank, and overflows, and flows down on the flat plate member of the partition member.

(18) At the upstream side of the pulp feed unit, a pulp feed tank storing the pulp suspension manufactured in the pulp making section is provided, and the pulp suspension in the pulp feed unit is continuously supplied into the frame body of the pulp feed unit by a suspension feed pump.

(19) Stirring means for stirring the pulp suspension is provided in the pulp feed tank.

(20) The drying belt conveyor unit includes a smooth surface endless belt having a specified width for receiving and conveying the wet paper made and formed in the paper making net conveyor unit, a drive motor for driving and moving the smooth surface endless belt, and a heating and drying unit for heating and drying the wet paper on the smooth surface endless belt, and at the downstream side position of the dewatering roll, the squeezed and dewatered wet paper on the paper making net conveyor unit is transferred and fixed and conveyed on the lower side of the smooth surface endless belt by the smooth surface structure of the smooth surface endless belt.

(21) The drying and heating unit has at least one heating unit provided along the running route of the smooth surface endless belt, and the wet paper on the smooth surface endless belt is heated and dried by the heating unit in its conveying process.

(22) The heating unit is provided in plural positions, and the heating temperature of heating units is individually adjusted.

(23) The heating unit of the heating and drying unit is a heater plate contacting slidably with the opposite side of the wet paper holding side of the smooth surface endless belt, and the wet paper on the smooth surface endless belt is indirectly heated and dried by the smooth surface endless belt heated by the heater plate.

(24) The heating unit of the heating and drying unit is a heater roll rolling and contacting with the wet paper on the smooth surface endless belt, and the wet paper on the smooth surface endless belt is directly heated and dried by the heater roll.

(25) The heating unit of the heating and drying unit is a hot air heater for blowing hot air to the wet paper on the smooth surface endless belt, and the wet paper on the smooth surface endless belt is directly heated and dried by the hot air heater.

(26) The smooth surface endless belt is composed of an elastic heat resistant material withstanding the heating action of the heating and drying unit.

(27) The smooth surface endless belt is a fluoroplastic belt.

(28) The smooth surface endless belt is a steel belt.

(29) The dewatering roll unit rolls and squeezes the mesh endless belt of the paper making net conveyor unit and the smooth surface endless belt of the drying belt conveyor flatly from upper and lower sides, and squeezes and dewaters the wet paper on the mesh endless belt.

(30) The dewatering roll unit includes a dewatering roll rolling and contacting with the mesh endless belt from the lower side, a press roll rolling and pressing the smooth surface endless belt against the dewatering roll from the lower side, and a drive motor for rotating and driving by interlocking the both rolls, and by these two rolls, the mesh endless belt and smooth surface endless belt are rolled and squeezed flatly from the upper and lower sides, and the moisture contained in the wet paper on the mesh endless belt is absorbed by the dewatering roll through the mesh endless belt.

(31) The dewatering roll has a dewatering layer made of porous material of fine and continuous pores formed on the outer circumference of a cylindrical roll of high rigidity material.

(32) The dewatering roll has a discharge roll for squeezing and discharging moisture contained in the dewatering roll, and this discharge roll rolls and contacts with the outer circumference of the dewatering roll in pressed state, and along with rotation of the dewatering roll, the discharge roll rolls and squeezes the dewatering layer of the dewatering roll, and the moisture absorbed in the dewatering layer is squeezed and discharged.

(33) The press roll is a cylindrical roll composed of high rigidity material.

(34) At the upstream side of the dewatering roll, a preliminarily dewatering roll for rolling and pressing the mesh endless belt from the lower side is disposed.

(35) The preliminarily dewatering roll has a dewatering roll of porous material of fine and continuous pores formed on the outer circumference of a cylindrical roll of high rigidity material.

(36) The preliminarily dewatering roll has a discharge roll for squeezing and discharging moisture contained in the dewatering roll, and this discharge roll rolls and contacts with the outer circumference of the preliminarily dewatering roll in pressed state, and along with rotation of the preliminarily dewatering roll, the discharge roll rolls and squeezes the dewatering layer of the preliminarily dewatering roll, and the moisture absorbed in the dewatering layer is squeezed and discharged.

(37) A slurry preventive roll for rolling and pressing the smooth surface endless belt from the upper side is disposed near the upstream side position of the dewatering roll.

(38) The slurry preventive roll is a cylindrical roll composed of high rigidity material.

(39) A smooth surface finishing roll for rolling and pressing the wet paper on the smooth surface endless belt is disposed in the midst of conveying route of the smooth surface endless belt.

(40) The smooth surface finishing roll is disposed in plural parallel rows at the opposite side of the smooth surface endless belt, in the heating unit provided along the running route of the smooth surface endless belt of the drying and heating unit.

(41) The smooth surface finishing roll has a built-in heater, and also has a function as heating roll.

(42) At the downstream side of the heating and drying unit of the smooth surface endless belt, there is a parting member for parting the dry paper dried on the smooth surface endless belt.

(43) At the downstream side of the parting member, a cutter is provide for cutting the recycled paper parted from the smooth surface endless belt to a specified length.

(44) In the paper making section, the smooth surface endless belt of the drying conveyor belt unit at the downstream side and the mesh endless belt of the paper making net conveyor unit at the upstream side are disposed in upper and lower layers, and at the upper and lower adjacent portion of the smooth surface endless belt and mesh endless belt, the dewatering roll is rolling and squeezing the mesh endless belt and smooth surface endless belt flatly from the upper and lower sides.

(45) The paper making net conveyor unit and the drying belt conveyor unit are driven by a common driving source.

A second aspect of the invention is a used paper recycling apparatus comprising a pulp making section for crushing and beating the used paper and making into pulp, and a paper making section for recycling paper by making used paper pulp from the pulp making section, which are incorporated in a furniture size apparatus case, in which the pulp making section includes a crushing unit for stirring and grinding the used paper, and a beating unit for beating the crushed used paper from the crushing unit, and the crushing unit and beating unit are circulating the used paper pulp, and the apparatus is installed at an originating source of used paper, and the used paper is crushed by the pulp making section and made into used paper pulp, and the used paper pulp is processed into recycled paper by the paper making section, and this recycled paper is used again at the originating source.

A pulp making device of the invention is used in a used paper recycling apparatus to be installed at an originating source of used paper for manufacturing used paper pulp by crushing and beating used paper, including a crushing unit for stirring and grinding the used paper, and a beating unit for beating the crushed used paper from the crushing unit, and the crushing unit and beating unit are circulating the used paper pulp.

Preferred embodiments include the following configurations.

(1) The crushing unit of the pulp making section includes stirring means for stirring the used paper, and water feeding means for supplying water to the stirring means, and the used paper charged from the inlet of the apparatus case is stirred in the water, and crushed and beaten.

(2) The stirring means includes a stirring tank for storing water supplied from the water feeding means having an inlet for used paper, a stirring impeller rotatably provided in the stirring tank, and a drive motor for rotating and driving the stirring impeller.

(3) A shredder unit is provided at the inlet of the stirring tank, and the used paper charged into the inlet is preliminarily cut by the shredder unit, and is stirred by the stirring impeller.

(4) The beating unit of the pulp making section includes a beating tank communicating with the stirring tank of the crushing unit, a beater roller provided rotatably in the beating tank, and a drive motor for rotating and driving the beater roller, and the used paper pulp supplied in the beating tank from the stirring tank is beaten by the beater roller, and is circulated again into the stirring tank.

(5) The beater roller has beating blades disposed at equal intervals on the outer circumference, and is supported rotatably around the horizontal shaft, the beating tank has a coaxial cylindrical inner wall along the contour of rotation of beating blades of the beater roller, and receiving blades cooperating with the beating blades of the beater roller are provided on the cylindrical inner wall, and the used paper pulp flowing in the beating tank are beaten by these two blades while passing the gaps between the rotating beating blades and fixed receiving blades.

(6) A lead angle is provided in the beating blades of the beater roller.

(7) The receiving blades of the beating tank are provided to be movable forward and backward in the radial direction of the beater roller, and by forward and backward adjustment of receiving blades, the gaps of the beating blades and receiving blades can be adjusted.

(8) A plurality of receiving blades are disposed at equal intervals in the circumferential direction on the cylindrical inner wall of the beating tank, and these receiving blades are movable forward and backward independently in the radial direction of the beater roller, and the beating speed of the beating unit is adjusted by control of gaps of beating blades and receiving blades by individual forward and backward adjustment of receiving blades.

(9) The beating tank is formed integrally in the lower part of the stirring tank, and the boundary from the stirring tank is opened and closed.

(10) While the crushing unit and beating unit are driven simultaneously, the beating tank composes a pulp circulation tan for circulating the used paper pulp together with the stirring tank, and the used paper pulp circulating in the pulp circulation tank is stirred and crushed by the crushing unit and beaten by the beating unit repeatedly.

(11) The stirring impeller of the beating unit is supported rotatably around the vertical axis in the bottom of the stirring tank, and a pulp inlet is opened in the beating tank at a height corresponding to the height of installation of the stirring impeller, and by rotation of stirring impeller flow of used paper pulp from the stirring tank into the beating tank is promoted.

A pulp supply device of the invention is incorporated in a used paper recycling apparatus of furniture size installed at the originating source of used paper, being a device for composing the pulp supply section of a paper making device for producing recycled paper by processing used paper pulp manufactured in pulp making section in a preceding process, for spreading uniformly and supplying slurry pulp suspension containing water and used paper pulp sent from the pulp making section, on the surface of mesh endless belt on which the paper making net conveyor runs.

Preferred embodiments include the following configurations.

(1) Comprising a partition member disposed slidably on the lower side of mesh endless belt, and a frame body disposed slidably on the upper side of mesh endless belt and defining the supply width of pulp suspension, the pulp suspension supplied in the frame body is diffused uniformly on the surface of running mesh endless belt disposed obliquely upward to the running direction, by the retention action by cooperation of the frame body and partition member.

(2) The partition member is a louver structure slidably supporting the lower side of the mesh endless belt, and the flow-down supply position of pulp suspension at the base end side has a flat plate member for supporting the mesh of the mesh endless belt in closed state.

(3) The frame body has a flat U-shaped main body frame opened at the leading end in the running direction side of mesh endless belt, and an overflow tank provided at the rear end of the main body frame, and the pulp suspension supplied in the frame body is once stored in the overflow tank, and overflows, and flows down on the flat plate member of the partition member.

(4) The main body frame has its inner width set in the width size of the paper to be recycled, and defines the supply width of pulp suspension, and its lower end side slides on the upper side of the obliquely running mesh endless belt.

(5) The overflow tank is affixed integrally at the rear end of main body frame, and the upper end edge of front wall is formed horizontally and straightly, and the upper end edge of front wall of overflow tank function as overflow unit of pulp suspension.

A dewatering device of the invention is incorporated in a used paper recycling apparatus of furniture size installed at the originating source of used paper, being a device for composing the dewatering section of a paper making device for producing recycled paper by processing used paper pulp manufactured in pulp making section in a preceding process, installed at a junction of a paper making net conveyor unit for manufacturing wet paper from slurry pulp suspension containing water and used paper pulp sent from the pulp making section, and a drying belt conveyor for making recycled paper by drying the wet paper formed in the paper making conveyor unit, for rolling and squeezing the mesh endless belt of the paper making net conveyor unit and the smooth surface endless belt of the drying belt conveyor flatly from upper and lower sides, and squeezing and dewatering the wet paper on the mesh endless belt.

Preferred embodiments include the following configurations.

(1) Comprising a dewatering roll rolling on the mesh endless belt from the lower side, a press roll rolling and pressing the smooth surface endless belt from the upper site opposite to the dewatering roll, and a drive motor for rotating and driving the both rolls, and by the dewatering roll and press roll, the mesh endless belt and smooth surface endless belt are rolled and squeezed flatly from the upper and lower sides, and the moisture contained in the wet paper on the mesh endless belt is absorbed by the dewatering roll through the mesh endless belt.

(2) The dewatering roll has a dewatering layer made of porous material of fine and continuous pores formed on the outer circumference of a cylindrical roll of high rigidity material.

(3) A discharge roll is provided for squeezing and discharging moisture contained in the dewatering layer of the dewatering roll, and this discharge roll rolls and contacts with the outer circumference of the dewatering roll in pressed state, and along with rotation of the dewatering roll, the discharge roll rolls and squeezes the dewatering layer of the dewatering roll, and the moisture absorbed in the dewatering layer is squeezed and discharged.

(4) The press roll is a cylindrical roll composed of high rigidity material.

(5) At the upstream side of the rolling and squeezing position by both belts of dewatering roll and press roll, a preliminarily dewatering roll for rolling and pressing the mesh endless belt from the lower side is disposed.

(6) The preliminarily dewatering roll has a dewatering roll of porous material of fine and continuous pores formed on the outer circumference of a cylindrical roll of high rigidity material.

(7) A discharge roll is provided for squeezing and discharging moisture contained in the dewatering layer of the preliminarily dewatering roll, and this discharge roll rolls and contacts with the outer circumference of the preliminarily dewatering roll in pressed state, and along with rotation of the preliminarily dewatering roll, the discharge roll rolls and squeezes the dewatering layer of the preliminarily dewatering roll, and the moisture absorbed in the dewatering layer is squeezed and discharged.

(8) A slurry preventive roll for rolling and pressing the smooth surface endless belt from the upper side is disposed near the upstream side of rolling and squeezing position of the both belts of dewatering roll and press roll.

(9) The slurry preventive roll is a cylindrical roll composed of high rigidity material.

According to the invention, the following outstanding features and effects are obtained, and it presents a used paper recycling apparatus that can be installed not only in a big office but also in small shop or general household, and is friendly to the environment and low in running cost, and is capable of preventing leak of confidential information or private data, and assuring high confidentiality.

(1) A pulp making section for crushing and beating the used paper and making into pulp, a paper making section for recycling paper by making used paper pulp from the pulp making section, and a control section for driving and controlling by interlocking the pulp making section and paper making section are incorporated in a furniture size apparatus case, and therefore the used paper can be recycled at the origin without being discarded, and the disposal is saved, and refuse problems are solved, and the limited resources can be utilized effectively.

Hitherto, recycling is not encouraged due to confidential problems, but when the used paper can be recycled at the origin, the effects of effective use of resources are tremendous.

(2) Since a compact used paper recycling apparatus having same function as large-scale plant is installed at the origin of used paper, paper can be used continuously repeatedly by recycling also at small shop or general household, and transportation and incineration cost of collection and disposal of used paper can be saved and it is very economical.

(3) The pulp making section includes a crushing unit for stirring and grinding the used paper, and a beating unit for beating the crushed used paper from the crushing unit, and the crushing unit and beating unit are circulating the used paper pulp, and therefore the used paper pulp is beaten efficiently according to the purpose, and appropriate beating effects are obtained, and recycled paper of high quality is manufactured.

(4) By the pulp making section for crushing and beating used paper, the paper is decomposed into fibers, and printed characters and diagrams are not readable, and leak of confidential and personal information can be prevented, and high confidentiality is assured.

(5) Besides, the apparatus is compact and can be installed in a small space of office, shop or general household, and from this point of view, too, leak of confidential and personal information can be prevented.

(6) The water used in the pulp making section is circulated water after dewatering and collecting in the paper making section, and the driving source of the pulp making section and paper making section is a drive source driven by general household alternating-current power source, and it is friendly to environment and low in running cost, and is hence economical.

(7) Being installed at the origin of used paper, the used paper is decomposed and transformed into used paper pulp by the pulp making section, and the used paper pulp is processed into recycled paper by the paper making section, and this recycled paper is used again at the origin, and therefore information of characters and diagrams printed in the used paper is not disclosed to outside of the origin, and leak of confidential and personal information is prevented securely, and high confidentiality is assured. At the same time, the resources can be utilized effectively.

By using the used paper recycling apparatus of the invention, there is no risk of diffusion of information to outside of the origin (for example, school, hospital, city office, law office, patent office, general household).

In other words, in the case of conventional shredder, if the used paper is cut into small pieces and printed characters and diagrams are not readable, cut pieces of paper are collected and transported and disposed at the incinerator or the like, and hence diffusion to outside of the origin cannot be prevented completely. To prevent diffusion to outside, used paper may be stored in the own warehouse or the like, but such place of storage is needed, and the resources cannot be used again.

By contrast, according to the used paper recycling apparatus of the invention, information printed in used paper is not diffused outside of the origin, and the resources can be utilized effectively.

These and other objects and feature of the invention will be appreciated more clearly by reading the following detailed description taken in conjunction with the accompanying drawings and novel facts mentioned in the claims thereof.

BRIEF DESCRIPTION OF THE DRAWINGS

FIG. 5 is a perspective view of outline of paper making section of the used paper recycling apparatus.

FIG. 6 is a plan view of drive linkage mechanism of the paper making section.

FIG. 9A is a schematic diagram explaining a specific mechanism of squeezing and dewatering of dewatering roll unit of the paper making section, showing a basic squeezing and dewatering mechanism.

FIG. 9B is a schematic diagram explaining a specific mechanism of squeezing and dewatering of dewatering roll unit of the paper making section, showing a squeezing and dewatering mechanism having a slurry preventive roll provided near the upstream side of the dewatering roll unit.

DETAILED DESCRIPTION OF THE PREFERRED EMBODIMENTS

Figure 1:
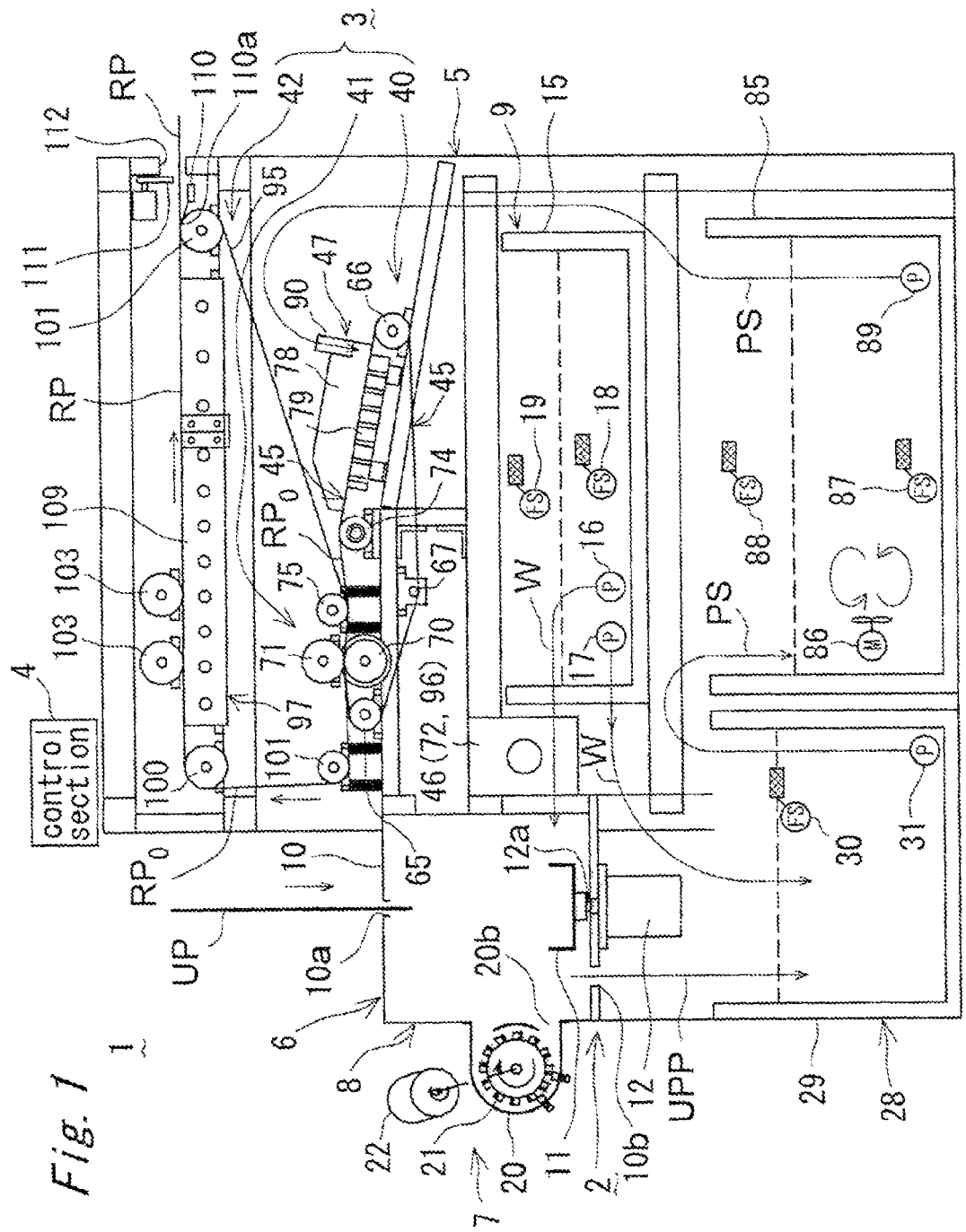
FIG. 1 is a front view of general structure of used paper recycling apparatus in preferred embodiment 1 of the invention, showing the apparatus case cut open.

Referring now to the drawings, preferred embodiments of the invention are specifically described below.

FIG. 1 to FIG. 16 show the used paper recycling apparatus of the invention, and same parts or components are identified with same reference numerals throughout the drawings.

Preferred Embodiment 1

The used paper recycling apparatus of the invention is shown in FIG. 1 to FIG. 9, and this used paper recycling apparatus 1 is installed at the origin of used paper, and recycles to be reusable at the same site without discarding the used paper, and the used paper UP includes confidential documents at government offices and private companies, personal letters at the general household, and other papers.

The used paper recycling apparatus 1 mainly consists of pulp making section 2, paper making section 3, and control section 4 as shown in FIG. 1, and these sections 2 to 4 are assembled in an apparatus case 5 in a compact design, and the driving source of the pulp making section 2 and paper making section 3 is a driving source driven by a general household alternating-current power source. The components are specifically described below.

I. Apparatus Case 5

The apparatus-case 5 has a furniture size, like bookshelf, locker, desk, copier or personal computer installed in an office, and the specific shape and size may be designed properly according to the purpose. The apparatus case 5 of the illustrated preferred embodiment is a cubic box having shape and dimensions similar to those of a copier.

II. Pulp Making Section 2

The pulp making section 2 is located at the process of crushing and beating used paper UP to make into used paper pulp, and includes a crushing unit 6 for stirring, grinding and crushing the used paper UP, and a beating unit 7 for beating the used paper UP crushed in the crushing unit 6, and the used paper UP is circulated between the crushing unit 6 and beating unit 7.

The crushing unit 6 includes stirring device (stirring means) 8 for stirring the used paper UP, and water feeding device (water feeding means) 9 for supplying water to the stirring device 8.

The stirring device 8 has a stirring tank 10, a stirring impeller 11, and a drive motor 12.

The stirring tank 10 has an inlet 10a to be opened and closed to outside of the apparatus case 5, in its ceiling wall, and the stirring impeller 11 is rotatably provided in its inside (in the bottom in the diagram).

The inner volume of stirring tank 10 is determined depending on the number of sheets of used paper UP to be stirred and processed at once. In the illustrated preferred embodiment, the stirring tank 10 is designed to have a volume capable of processing about 8 sheets (about 32 g) of A4 format paper from plain paper copier (PPC) by adding about 3 liters of water in batch.

The stirring impeller 11 has a direct motor structure directly mounted and fixed on rotary shaft 12a of drive motor 12 in horizontal state, and is rotated and driven normally and reversely by the drive motor 12. The drive motor 12 is an electric motor, and is electrically connected to the control section 4.

Normal and reverse rotation of the stirring impeller 11 is intended to prevent entangling on the stirring impeller 11 when A4 size paper is directly stirred, by the action of water jet of reverse rotation after normal rotation.

In relation to this action, the blade shape of stirring impeller 11 is designed to be different in the stirring force (diffusion effect) between normal rotation and reverse rotation, so that waste papers UP may be crushed and beaten uniformly.

The operation condition of stirring impeller 11 such as changeover timing of normal rotation and reverse rotation and stirring duration is determined to have the best crushing and beating effect of used paper UP on the basis of data obtained from preliminary experiments.

The water feeding device 9 has a white water collection tank 15, and a water feeding pump 16. The white water collection tank 15 is, as described specifically below, a tank for collecting white water W (pulp water of extremely low concentration filtered by the paper net in the paper making process) filtered and dewatered in the paper making section 3, and the white water W collected in the white water tank 15 is supplied as water for stirring to the stirring tank 10 of the stirring device 8.

As described below, the water feeding device 9 functions also as water feeding device for concentration adjustment (water feeding means for concentration adjustment) of pulp concentration adjusting unit 28, and for this purpose, it has a water feeding pump for concentration adjustment 17 for supplying the white water W in the white water collection tank to a concentration adjusting tank 29 as water for concentration adjustment. Reference numerals 18 and 19 are lower limit float switch and upper limit float switch provided in the white water collection tank 15.

In the stirring device 8, the used paper UP charged into the stirring tank 10 from the inlet 10a of the apparatus case 5 is stirred for specified time (5 minutes to 30 minutes in the shown example) in the water W supplied from the water feeding device 9 by normal and reverse rotation of stirring impeller 11 by drive motor 12, and crushed and beaten, and used paper pulp UPP is obtained.

The beating unit 7 includes a beating tank 20 communicating with the stirring tank 10 of the crushing unit 6, a beater roller 21 rotatably provide din the beating tank 20, and a drive motor 22 for rotating and driving the beater roller 21.

Figure 2:
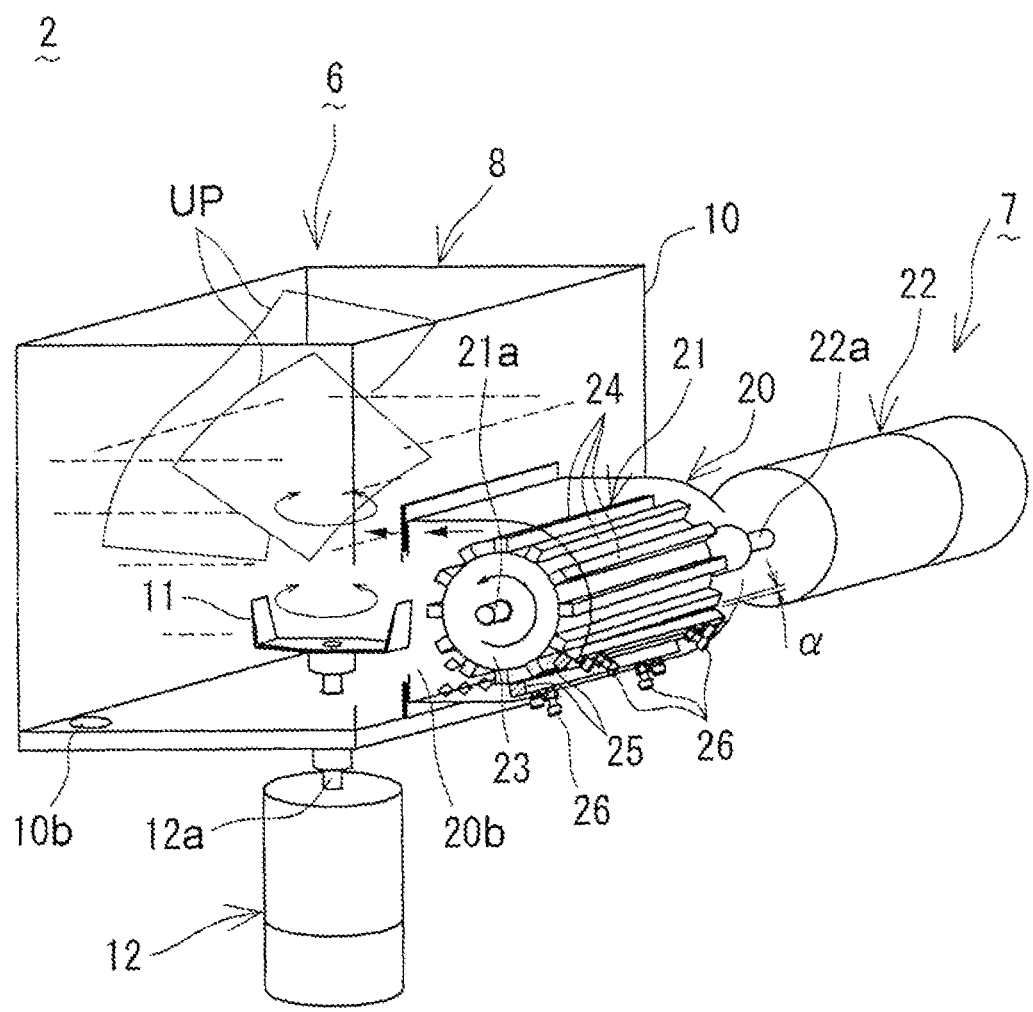
FIG. 2 is a partially see-through perspective view of beating unit of pulp making section of the used paper recycling apparatus.

As shown in FIG. 1 and FIG. 2, the beating tank 20 is formed integrally in the lower part of the stirring tank 10, and the beater roller 21 is supported inside rotatably around the horizontal axis.

Figure 3A:
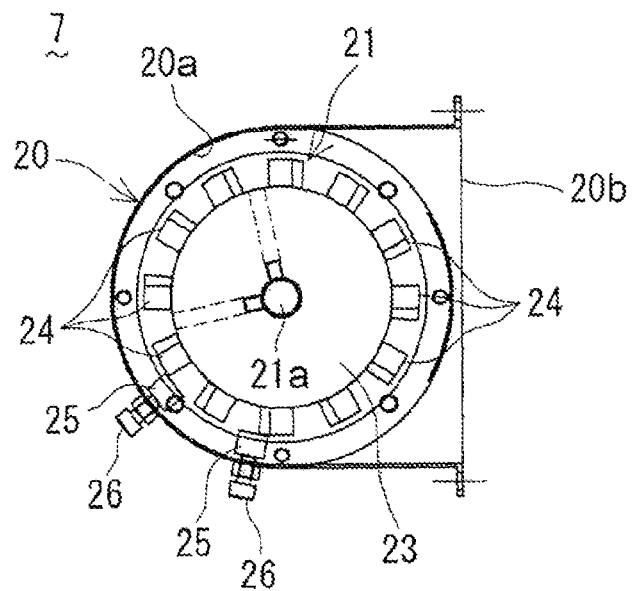
FIG. 3A is a side view of the beating unit, showing the inside of beating tank partially cut open.
Figure 3B:
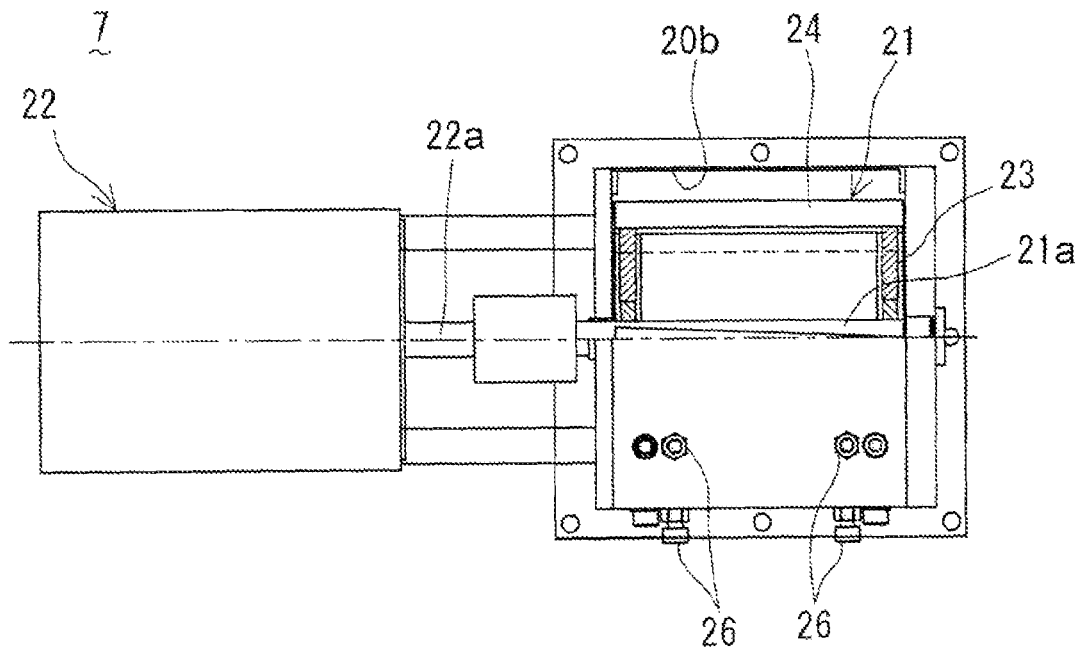
FIG. 3B is a front view of the beating unit, showing the inside of beating tank partially cut open.
Figure 4A:
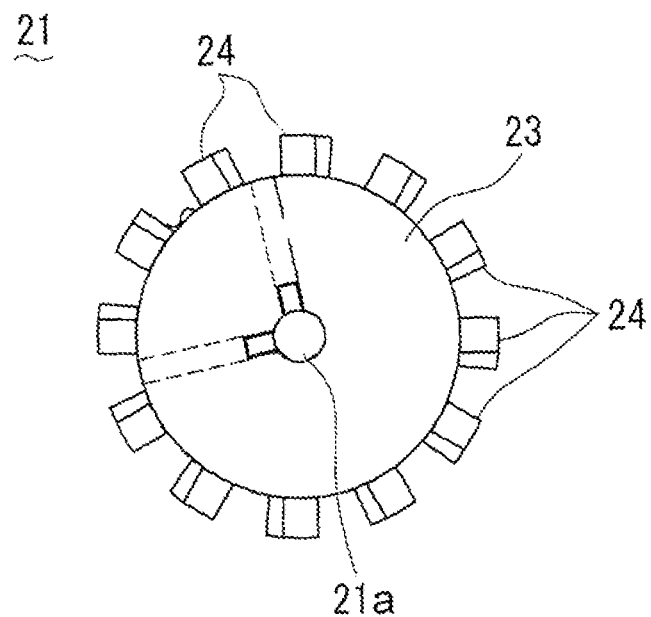
FIG. 4A is a side view of the beating unit, showing a beater roller.
Figure 4B:
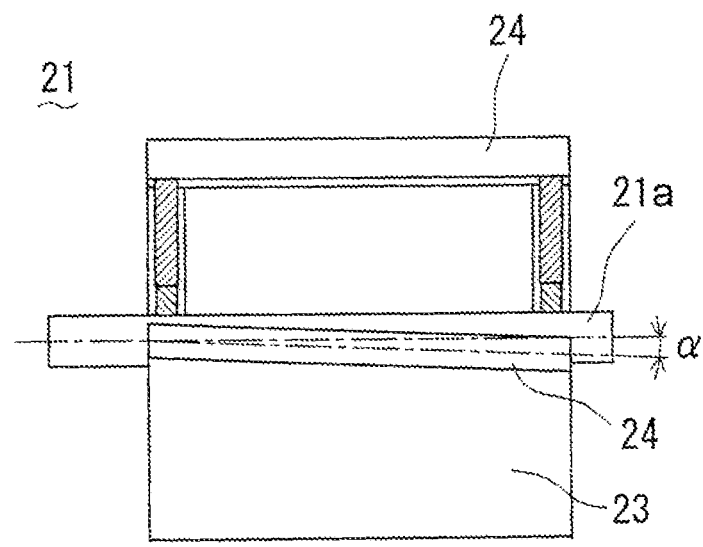
FIG. 4B is a front view of the beating unit, showing the beater roller partially cut open.

The beater roller 21 has, as shown in FIG. 2 and FIG. 3, a plurality of square columnar beating blades 24 provided on the outer circumference of a cylindrical roller main body 23, radially at equal intervals around the circumferential direction. Preferably, for increasing the cutting force of the beater roller 21, specified lead angle $\alpha$ (about 2 to 4 degrees in the preferred embodiment) is provided in the beating blades 24, 24, . . . .

Specifically, as shown in FIG. 3A, the drive motor 22 is mounted and fixed in horizontal state outside of the side wall of the beating tank 20, and its rotary shaft 22a is extended and supported in horizontal state inside the beating tank 20, and the beater roller 21 is directly mounted and fixed on the rotary shaft 22a, and a direct motor structure is formed. The drive motor 22 is an electric motor, and is electrically connected to the control section 4.

The beating tank 20 has a cylindrical inner wall 20a coaxial with the beater roller 21, along the contour of rotation of the beating blades 24, 24, . . . of the beater roller 21, and the boundary 20b to the stirring tank 10 is a square communication opening, and this communication opening 20b is designed to open and close.

Specific structure of its opening and closing means is not shown, but conventionally known manual or automatic opening and closing lid is used, and the lid member of opening and closing lid is not particularly specified, and may include a plate material of complete closing type, and mesh type for passing only used paper pulp UPP smaller than specified particle size. The opening and closing means closes the communication opening 20b when the operation of beating unit 7 is stopped, and prevents entry of used paper UP or used paper pulp UPP from the stirring tank 10 of the stirring device 8 into the beating tank 20. While the beating unit 7 is operating, the communication opening 20b is opened, and circulation flow of used paper pulp UPP is allowed between the stirring tank 10 and beating tank 20.

On the cylindrical inner wall 20a of the beating tank 20, a plurality of receiving blades 25, 25, . . . cooperating with the beating blades 24, 24, . . . of the beater roller 21 are provided radially at equal intervals in the circumferential direction. In the illustrated preferred embodiment, as shown in FIG. 2 and FIG. 3A, two square columnar receiving blades 25, 25 are provided. The gap size between the tip of the receiving blades 25, 25 and the tip of beating blades 24, 24, . . . of the beater roller 21 is set at fractions of one millimeter, and this gap size can be finely adjusted depending on the purpose. Since the gap size can be finely adjusted, the cooperating action of beating blades 24, 24, . . . and receiving blades 25, 25 produces a high pressure and sliding force depending on the strength and driving force of the apparatus mechanical structure.

Specifically, the receiving blades 25, 25 are provided to be movable forward and backward in the radial direction of beater roller 21 by means of individual adjusting bolts 26, and by turning the adjusting bolts 26 and moving the receiving rollers 25 back and forth, the gap size of beating blades 24, 24, . . . and receiving blades 25 can be adjusted. Since the plurality of (two in this case) receiving blades 25, 25 are movable forward and backward independently in the radial direction of beater roller 21, by individually adjusting the receiving blades 25, 25 and adjusting the gap size of beating blades 24, 24, . . . and receiving blades 25, 25, the beating speed of the beating unit 7 can be properly adjusted. Also by individually adjusting the receiving blades 25, 25, the gap size can be adjusted individually, and therefore by increasing or decreasing the receiving blades 25, 25, . . . , the beating time can be increased or decreased depending on the number of receiving blades.

In the beating unit 7, by rotary motion in arrow direction of beater roller 21 by the drive motor 22, the used paper pulp UPP supplied in the beating tank 20 from the stirring tank 10 flows in the rotating direction of the beater roller 21, and passes through the gap between the rotating beating blades 24, 24, . . . of the beater roller 21 and the fixed receiving blades 25, 25, and is beaten by the both blades 24, 25, and is circulated again into the stirring tank 10.

In this case, if the crushing unit 6 and beating unit 7 are driven simultaneously, the used paper pulp UPP in the stirring tank 10 stirred by the stirring impeller 11 is elevated in the water level in its outer circumference, and the used paper pulp UPP buries the beater roller 21, and further the communication opening 20b of the beating tank 20 is entirely buried. As a result, the beating tank 20, together with the stirring tank 10 of the crushing unit 6, composes a pulp circulation cell for circulating the used paper pulp UPP, and the used paper pulp UPP circulating in the pulp circulation cells 10, 20 is stirred and crushed by the crushing unit 6 and beaten by the beating unit 7 repeatedly. In other words, the used paper pulp UPP beaten by the beater roller 21 in the beating tank 20 of the beating unit 7 is discharged into the stirring tank 10 of the crushing unit 6, and is uniformly stirred by the stirring impeller 11 in the stirring tank 10, and supplied again into the beating unit 7, and this process is repeated several times, and hence the used paper pulp UPP in the tanks is uniformly crushed and beaten. As a result, an optimum paper strength is assured for the recycled paper RP manufactured in the paper making section 3 described below.

The stirring impeller 11 of the crushing unit 6 is, as shown in FIG. 1 and FIG. 2, supported rotatably around the vertical axis in the bottom of the stirring tank 10, and the pulp inlet of the beating tank 20, that is, the lower part of the communication opening 20b is provided at height position corresponding to the height of installation of the stirring impeller 11, and by the rotary action of the stirring impeller 11, flow of used paper pulp UPP from the stirring tank 10 into the beating tank 20 is promoted, and further by cooperation with rotary action of beater roller 21, the used paper pulp UPP circulates and flows smoothly between the pulp circulation cells 10, 20.

The pulp concentration adjusting unit 28 is provided at the downstream side of the stirring tank 10, and adjusts the concentration of used paper pulp UPP manufactured in the stirring tank 10 to an appropriate concentration suited to the subsequent paper making process. The pulp concentration adjusting unit 28 includes a concentration adjusting tank 29 storing the used paper pulp UPP manufactured in the stirring tank 10, and a water feeding device for concentration adjustment (water feeding means for concentration adjustment) for supplying water to the concentration adjusting tank 29, and the water feeding device 9 is also used as the water feeding device for concentration adjustment as mentioned above.

The inner volume of concentration adjusting tank 29 is determined depending on the number of sheets (quantity) of used paper UP processed in batch in the stirring device 8. In the illustrated preferred embodiment, as mentioned above, it is designed to process about 8 sheets (about 32 g) of A4 format used paper UP in batch, and the concentration adjusting tank 29 is designed to have a volume enough for adjusting the concentration of a corresponding volume of used paper pulp UPP.

In relation to this, a drain port 10b is provided in the bottom of the stirring tank 10 of the stirring device 8, and the drain port 10b is opened and closed by a drain valve not shown. The drain valve is specifically an electromagnetic opening and closing valve, and is electrically connected to the control section 4.

In a specific concentration adjusting method of pulp concentration adjusting unit 28, in the concentration adjusting tank 29, water W is added from the water feeding device for concentration adjustment 9 to the whole volume of used paper pulp UPP manufactured in batch in the stirring tank 10, and when the total volume of used paper pulp UPP and water W becomes a specified value, the pulp suspension PS is designed to achieve the specified concentration. The target concentration of pulp suspension PS to be adjusted is determined in consideration of paper making capacity in the paper making section 3 described below, on the basis of data of preliminary experiments, and the concentration is set at about 0.1% in the shown case. Reference numeral 30 is a float switch provided in the concentration adjusting tank 29, which detects the water level when the volume of pulp suspension PS (total volume of used paper pulp UPP and water W) in the concentration adjusting tank 29 reaches the specified value.

Hence, in the concentration adjusting tank 29, the whole volume of used paper pulp UPP manufactured in the stirring tank (and beating tank 20) is dropped and supplied into the concentration adjusting tank 29 by gravity from the drain port 10b of the stirring tank 10, and white water W is added to the used paper pulp UPP from the water feeding device for concentration adjustment 9 up to the specified value (detected by the float switch 30), and the concentration of the used paper pulp UPP is adjusted, and pulp suspension PS of specified concentration is prepared. In the illustrated preferred embodiment, to the whole volume of used paper pulp UPP (about 32 g of used paper UP+3 liters of water W), diluting water W is added from the water feeding device for concentration adjustment 9, and the total volume (total amount) of used paper pulp UPP and water W is controlled to be 30 liters, and hence pulp suspension PS of concentration of about 0.1% (target concentration) is prepared. The pulp suspension PS thus adjusted in concentration is sent to pulp feeding tank 85 of paper making section 3 in next process by first suspension feeding pump 31.

While the used paper pulp UPP is dropped and supplied into the concentration adjusting tank 29 from the drain port 10b of the stirring tank 10, in the stirring tank 10, water W is supplied from the water feeding device 9 into the water feeding pump 16, and the stirring impeller 11 is rotated by the drive motor 12, and the inside of the stirring tank 10 is cleaned.

Thus, the water feeding source of the water feeding device 9 is white water W dewatered in the paper making section 3 to be collected in the white water collection tank 15, and in other words, the white water W dewatered and collected in the paper making section 3 is entirely circulated and reused between the stirring device 8 of the crushing unit 6 and the pulp concentration adjusting unit 28.

III. Paper Making Section 3

The paper making section 3 is located at the process of manufacturing recycled paper RP by processing the used paper pulp UPP manufactured in the crushing unit 6, and consists of a paper making net conveyor unit 40, a dewatering roll unit 41, and a drying belt conveyor unit 42.

The paper making net conveyor unit 40 is a location for producing wet paper by processing slurry pulp suspension PS containing water W and used paper pulp UPP sent from the crushing unit 6, and includes a mesh endless belt 45, a drive motor 46, and a pulp feeding unit 47.

The mesh endless belt 45 processes and conveys the pulp suspension PS, and specifically it is an endless belt connected and formed in a ring of specified length consisting of plate member of paper making mesh structure of specified width. The specified width is set slightly larger than the width size of the recycled paper RP to be manufacture from the pulp suspension PS. The plate member of paper making mesh structure is a material capable of filtering and dewatering properly the pulp suspension PS by the innumerable mesh cells of paper making mesh structure, and is preferably made of material excellent in corrosion resistance, such as polypropylene (PP), polyethylene terephthalate (PET), polyamide (PA) (generally known as nylon), and stainless steel (SUS), and in the illustrated preferred embodiment, a PET mesh endless belt 45 is shown. The specified length is long enough for manufacturing the pulp suspension PS in a proper weight in relation to the running speed of mesh endless belt 45, and is defined in a size to be contained in the accommodating space of the paper making net conveyor unit 40 in the apparatus case 5.

The mesh endless belt 45 is, as shown in FIG. 1 and FIG. 2, rotatably suspended and supported through drive roller 65, driven roller 66, support roller 67, dewatering roll 70, and preliminarily dewatering roll 74, and is driven and coupled to the drive motor 46 by way of the drive roller 65.

The drive motor 46 for running and driving the mesh endless belt 45 is an electric motor, and is electrically connected to the drive section 4. This drive motor 46 is commonly used as running and driving source of the dewatering roll 41 and drying conveyor 42 mentioned below, and the commonly using structure or the drive coupling mechanism is described later.

The pulp feeding unit 47 is a location for feeding the pulp suspension PS from the crushing unit 6 onto the mesh endless belt 45, and specifically from this pulp feeding unit 47, the pulp suspension PS is uniformly spread and supplied on the surface of the mesh endless belt 45.

Figure 7:
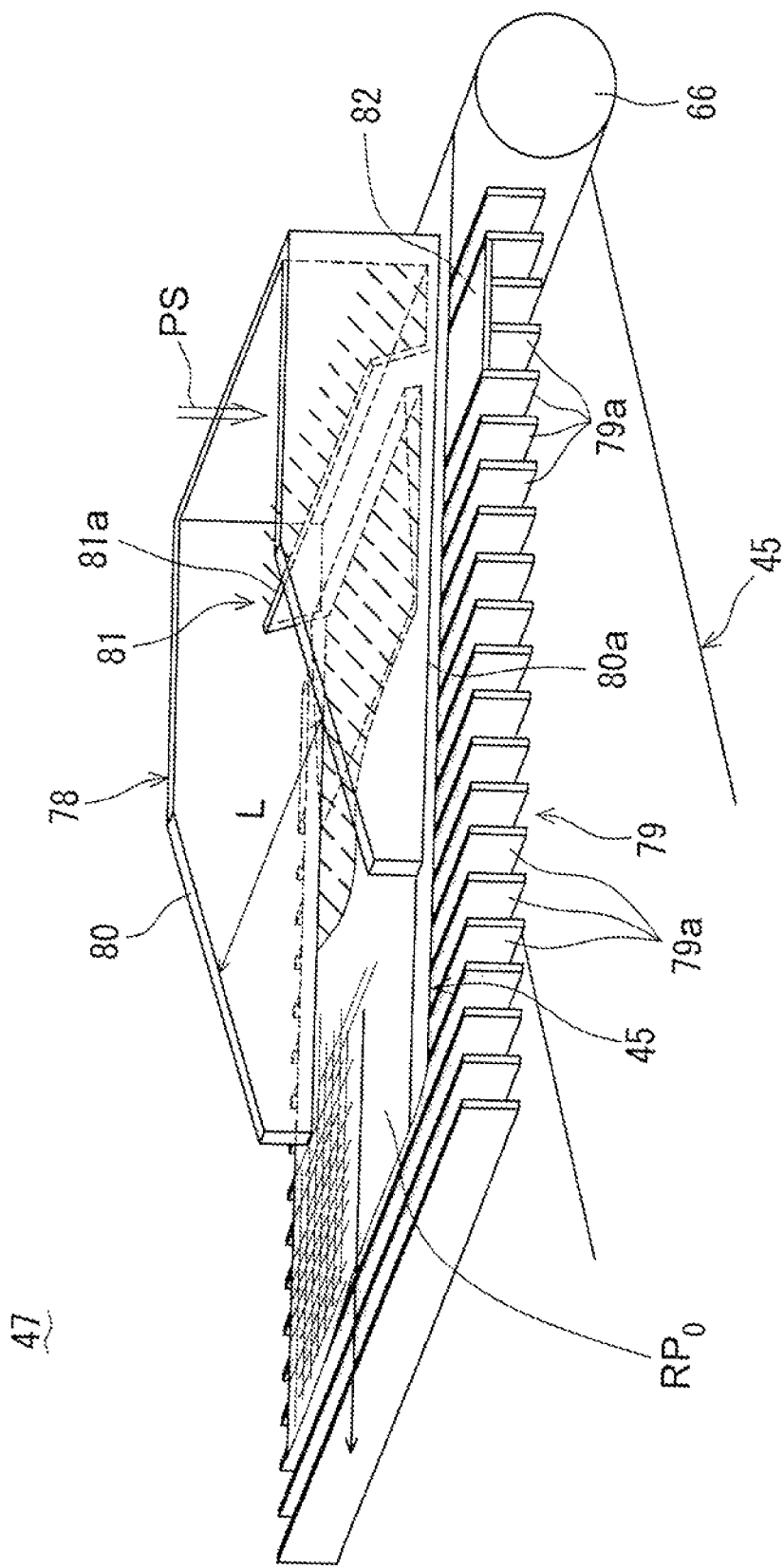
FIG. 7 is a magnified perspective view of structure of pulp feed unit of the paper making section.
Figure 8:
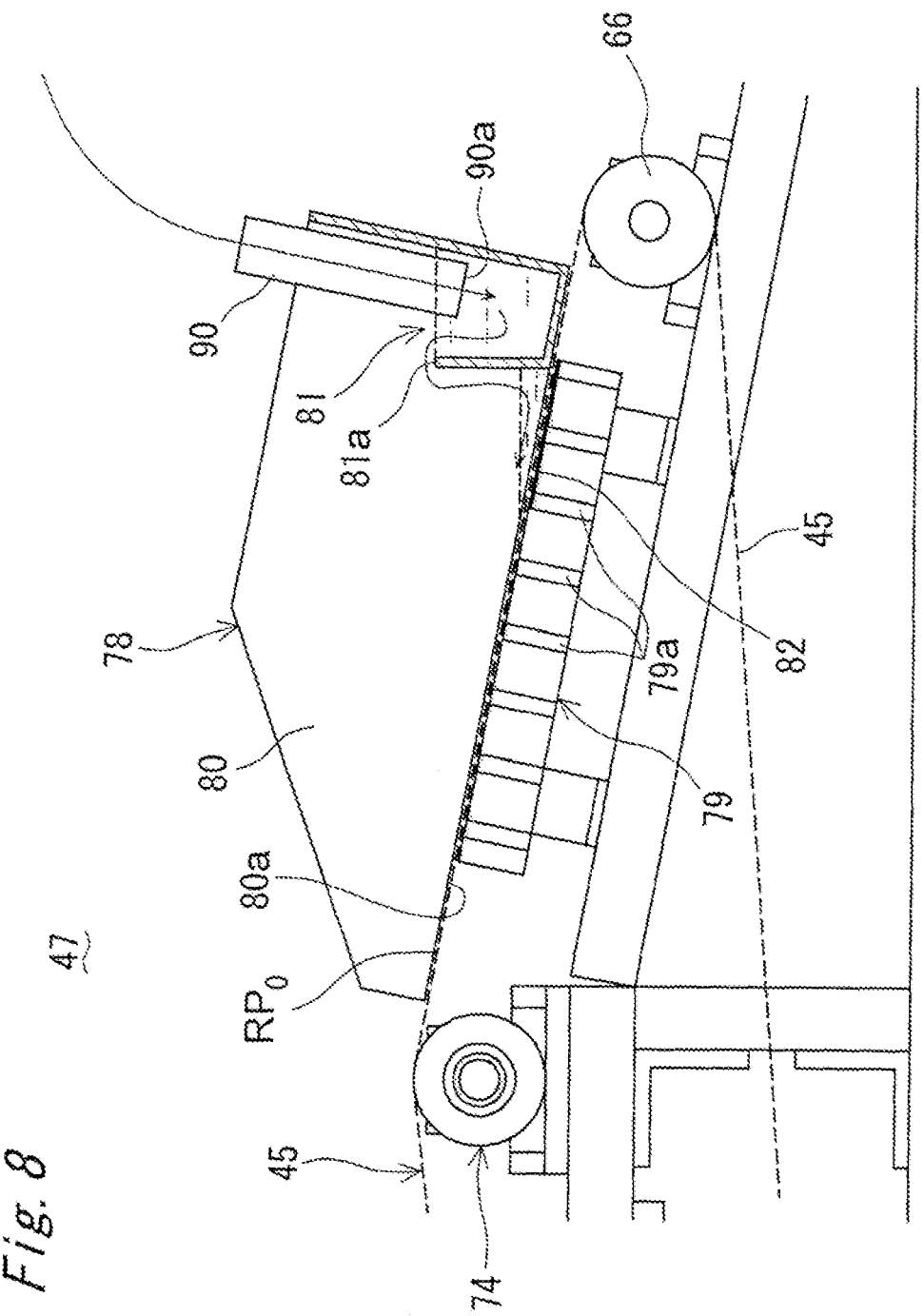
FIG. 8 is a partially cut-away front view of pulp feed unit.

A specific structure of the pulp feeding unit 47 is shown in FIG. 7 and FIG. 8. That is, in the pulp feeding unit 47, the mesh endless belt 45 is disposed upward obliquely to the running direction, and a frame body 78 and a partition member 79 are disposed at the upper and lower side positions of the mesh endless belt 45.

The frame body 78 is disposed slidably on the upper surface of the mesh endless belt 45, and includes, as shown in FIG. 7 and FIG. 8, a main body frame 80 of flat U-shape, opened at the leading end or the end of the running direction of the mesh endless belt 45, and an overflow tank 81 provided at the rear end of the main body frame 80.

The main body frame 80 is disposed so that its lower end side 80a may slide on the upper surface of the obliquely running mesh endless belt 45, and the inside width dimension (see FIG. 7) of the main body frame 80 is set in the width dimension of recycle paper RP to be manufactured.

The overflow tank 81 is fixed integrally at the rear end of the main body frame 80, and its front wall upper end edge 81a is an overflow portion formed horizontally and straightly, and in this overflow tank 81, a feed opening 90a of suspension feeding piping 90 for supplying pulp suspension PS of pulp feeding tank 85 described below is disposed oppositely.

The pulp suspension PS is supplied and stored in the overflow tank 81 from the suspension feeding piping 90, and when the overflow tank 81 is filled up with the pulp suspension PS, by further supply of pulp suspension PS, the pulp suspension PS overflows as indicated by arrow in FIG. 8 from the overflow portion 81a of the overflow tank 81, and flows down onto a flat plate member 82 of the partition member 79 described below.

The partition member 79 is disposed slidably at the lower side of the mesh endless belt 45, and has, as shown in FIG. 7 and FIG. 8, a draining louver structure composed of a plurality of framework members 79a, 79a, . . . , and has the shape and dimensions for slidably supporting the full width of lower side of the mesh endless belt 45, and the base end side position of the louver structure is closed by a flat plate member 82.

The flat plate member 82 is provided at a position corresponding to the overflow tank 81 of the frame body 78, and specifically, as shown in FIG. 8, it is disposed corresponding to the flow-down position of pulp suspension PS overflowing from the overflow tank 81, and hence the mesh at the flow-down supply position of pulp suspension PS in the mesh endless belt 45 is held in closed state by the flat plate member 82.

At the upstream side of the pulp feeding unit 47, a pulp feeding tank 85 is provided for supplying pulp suspension PS to the pulp feeding unit 47.

This pulp feeding tank 85 stores the pulp suspension PS manufactured in the crushing unit 6 and supplied by the first suspension feeding pump 31. The pulp feeding tank 85 incorporates a stirring device 86 for stirring the stored pulp suspension PS, and the concentration of the pulp suspension PS is kept constant. The stirring device 86 is either stirring pump or stirring impeller, and the stirring impeller is used in the illustrated preferred embodiment.

The pulp suspension PS stored in the pulp feeding tank 85 is detected by lower limit float switch 87 and upper limit flow switch 88, and is supplied continuously into the overflow tank 81 of the pulp feeding unit 47 by a second suspension feeding pump (suspension feeding pump) 89.

Thus, the pulp suspension PS stored in the pulp feeding tank 85 is supplied into the overflow tank 81 of the pulp feeding unit 47 by the second suspension feeding pump 89, and this pulp suspension PS supplied in the overflow tank 81 overflows from the overflow tank 81, and flows down on the flat plate member 82 as shown in FIG. 7 and FIG. 8.

The pulp suspension PS is diffused uniformly on the surface of the mesh endless belt 45 by the retention action by cooperation of the main body frame 80 of frame body 78 and partition member 79, and is conveyed together with the mesh endless belt 45 while keeping the width dimension specified by the main body frame 80 by the running action in the arrow direction of the mesh endless belt 45, and is dewatered by the gravity filtering action of the mesh of the mesh endless belt 45, and wet paper RP0 is formed. The white water W resulting from filtering and dewatering (pulp water of very low concentration filtered by the paper making mesh in the process) is collected in the white water collecting tank 15 of the water feeding device 9 as mentioned above.

In the pulp feeding unit 47, the mesh endless belt 45 is supported so that the running position may be horizontal in lateral direction, that is, the upper side contour line at a section vertical to the running direction of the mesh endless belt 45 may be in horizontal state. By such configuration, it is effective to prevent occurrence of bias in the lateral width direction in stagnant state of pulp suspension PS by cooperation of main body frame 80 and partition member 79, and the thickness of the prepared wet paper RP0 is uniform in lateral width direction, so that the thickness of the entire paper may be uniform.

Structurally, when the retention action by cooperation of main body frame 80 of frame body 78 and partition member 79 is effectively expressed, the overflow tank 81 may be omitted, and the pulp suspension PS may be supplied directly onto the flat plate member 82 from the suspension feed piping 90.

The dewatering roll unit 41 is a location for squeezing and dewatering the wet paper RP0 on the mesh endless belt 45 at linkage of the paper making net conveyor unit 40 and drying conveyor unit 42 described below.

Specifically, a smooth surface endless belt 95 of the drying conveyor unit 42 at the downstream side, and the mesh endless belt 45 of the paper making net conveyor unit 40 at the upstream side are disposed in upper and lower layers or tiers as shown in FIG. 1 and FIG. 2, and the upper and lower adjacent portion of the smooth surface endless belt 95 and mesh endless belt 45 corresponds to the linkage, and the dewatering roll unit 41 is designed to roll and squeeze the mesh endless belt 45 and smooth surface endless belt 95 flatly from upper and lower sides.

The dewatering roll unit 41 mainly comprises dewatering roll 70, press roll 71, and drive motor 72, and also has preliminarily dewatering roll 74 and slurry preventive roll 75 as assisting parts.

The dewatering roll 70 rolls on the mesh endless belt 45 from the lower side, and specifically a dewatering layer 70b of porous material of fine and continuous pores is wound on the outer circumference of a cylindrical roll 70a of rigid material. The dewatering layer 70b is formed of a material excellent in hydrophilic property, water absorbing property and water retaining property, and is preferably a porous material of fine and continuous pores excellent in flexibility. The winding structure of dewatering layer 70b on the cylindrical roll 70a is either single-layer structure of winding a relatively thick dewatering layer 70b on the outer circumference of cylindrical roll 70a by one turn, or fitting a cylindrical dewatering layer 70b externally to the cylindrical roll 70a, or multi-layer structure of winding thin dewatering layer 70b on the outer circumference of cylindrical roll 70a by plural turns.

The dewatering roll 70 of the illustrated preferred embodiment is a single-layer structure having a cylindrical dewatering layer 70b of foamed material of fine and continuous pores of micron size fitted externally to the cylindrical outer circumference of cylindrical roll 70a of stainless steel.

The press roll 71 rolls and presses the smooth surface endless belt 95 of the drying belt conveyor unit 42 from the upper side, and specifically it is a cylindrical roll of rigid material. The press roll 71 of the illustrated preferred embodiment is a stainless steel cylindrical roll.

The dewatering roll 70 and press roll 71 are specifically driven and coupled to a single drive motor 72, and the both rolls 70, 71 are rotated and driven in cooperation. In this case, the both rolls 70, 71 are controlled in rotation so that the outer circumferences of the both rolls 70, 71 may roll and contact with each other mutually substantially at same rotating speed on the contact surfaces (lower side of mesh endless belt 45 and upper side of smooth surface endless belt 95) of mesh endless belt 45 and smooth surface endless belt 95 rolled and squeezed flatly between the outer circumferences.

The drive motor 72 is used commonly with the drive motor 46 of the paper making net conveyor unit 40 as described below in the illustrated preferred embodiment.

By driving of drive motor 72 (56), the both rolls 70, 71 roll and squeeze the both belts 55, 95 flatly from upper and lower sides, and moisture M contained in the wet paper RP0 on the mesh endless belt 45 is absorbed by the dewatering roll 70 through the mesh endless belt 45. White water W after squeezing and dewatering is collected in the white water collecting tank 15 of the water feeding device 9.

Specific mechanism of squeezing and dewatering is explained by referring to FIG. 9A, in which the both rolls 70, 71 rotate, and the mesh endless belt 45 on which the wet paper RP0 is mounted and the smooth surface endless belt 95 are guided in between the both rolls 70, 71 with the wet paper RP0 interposed between them, and are rolled and squeezed flatly from the upper and lower sides. As a result, the moisture M contained in the wet paper RP0 is squeezed out to the upstream side of the both rolls 70, 71 (the right side in the drawing), but since the upper side smooth surface endless belt 95 has a smooth surface without pores as described below, the squeezed moisture M entirely passes through fine and continuous pores of the lower side mesh endless belt 45, and is absorbed by the dewatering layer 70b of the dewatering roll 70.

The preliminarily dewatering roll 74 and slurry preventive roll 75 are provided for assisting the squeezing and dewatering action by the press roll 71 and dewatering roll 70 in the dewatering roll unit 41.

The preliminarily dewatering roll 74 is disposed, as shown in FIG. 1, so as to apply tension to the mesh endless belt 45 by rolling on the mesh endless belt 45 from the lower side at the upstream side of the dewatering roll unit 41.

The preliminarily dewatering roll 74 has a structure same as the dewatering roll 70, and a dewatering layer 74b of porous material of fine and continuous pores is wound on the outer circumference of a cylindrical roll 74a of rigid material. The preliminarily dewatering roll 74 in the illustrated preferred embodiment is a single layer structure having a cylindrical dewatering layer 74b of continuous foamed material of fine and continuous pores of micron size wound on the cylindrical outer circumference of cylindrical roll 74a of stainless steel.

The wet paper RP0 diffused uniformly on the surface of the mesh endless belt 45 and conveyed together with the mesh endless belt 45 is filtered and dewatered by the mesh endless belt 45, and is also absorbed and dewatered by the preliminarily dewatering roll 74, which preliminarily assists squeezing and dewatering action of the press roll 71 and dewatering roll 70.

The slurry preventive roll 75 is disposed, as shown in FIG. 1 and FIG. 9B, near the upstream side of the dewatering roll 41, for pressing the smooth surface endless belt 95 to the wet paper RP0 on the lower side mesh endless belt 45 by rolling and pressing the smooth surface endless belt 95 from the upper side.

A specific structure of slurry preventive roll 75 is same as in the press roll 71, and specifically it is a cylindrical roll of rigid material, and the slurry preventive roll 75 of the illustrated preferred embodiment is a cylindrical roll of stainless steel.

Referring now to FIG. 9B, when the mesh endless belt 45 and the smooth surface endless belt 95 on which the wet paper RP0 is mounted are rolled and squeezed flatly from upper and lower side by the dewatering roll 70 and press roll 71, the moisture M contained in the wet paper RP0 is squeezed to the upstream side of the both rolls 70, 71 (the right side in the drawing), and at the same time the moisture M held in the dewatering roll 70 as a result of squeezing and dewatering is also squeezed out.

In this case, if the slurry preventive roll 75 is not provided, as shown in FIG. 9A, near the upstream side of the both rolls 70, 71, the upper side smooth surface endless belt 95 is apart from the wet paper RP0 on the lower side mesh endless belt 45, and part M' of moisture M combining the moisture squeezed from the wet paper RP0 and moisture held in the dewatering roll 70 may not be absorbed by the dewatering roll 70 through the mesh endless belt 45, but may be absorbed by the wet paper RP0, and the wet paper RP0 may return to slurry state.

By contrast, when the slurry preventive roll 75 is provided, as shown in FIG. 9B, near the upstream side of both rolls 70, 71, the upper side smooth surface endless belt 95 is pressed to the wet paper RP0 on the lower side mesh endless belt 45, and therefore all of moisture M combining the moisture squeezed from the wet paper RP0 and moisture held in the dewatering roll 70 drops to the lower side through the mesh endless belt 45, and is not absorbed again in the wet paper RP0, and the wet paper RP0 is completely prevented from returning to slurry state, and the squeezing and dewatering action by the press roll 71 and dewatering roll 70 can be assisted preliminarily.

By squeezing of both rolls 70, 71, part of moisture M of wet paper RP0 squeezed to the upstream side passes between the both rolls 70, 71 together with the dewatering layer 70*b* of the dewatering roll 70 and wet paper RP0, and on the moment of passing between the both rolls 70, 71, the dewatering layer 70*b* of the dewatering roll 70 elastically returns to the original shape, and by this original shape restoring action, the wet paper RP0 is further dewatered. As a result, the moisture content of the wet paper RP0 is decreased to a specified value.

The wet paper RP0 squeezed and dewatered by the dewatering roll unit 41 is transferred and rolled on the lower side of the upper side smooth surface endless belt 95 from the upper side of the lower side mesh endless belt 45 at downstream side position of dewatering roll unit 41, and is conveyed together with the smooth surface endless belt 95, and is dried by the drying belt conveyor unit 42.

Meanwhile, the rolling action seems to be caused by smooth surface structure of the smooth surface endless belt 95. That is, the surface of the lower side mesh endless belt 45 is rough and porous with many continuous fine pores, whereas the surface of the upper side smooth surface endless belt 95 is smooth and intact, and hence the wet paper RP0 containing moisture is considered to be adsorbed by the surface tension against the surface of the smooth surface endless belt 95.

The drying belt conveyor unit 42 is a location for manufacturing recycled paper RP by drying the wet paper RP0 squeezed and dewatered in the dewatering roll unit 41 after the paper making process in the paper making net conveyor 40, and includes the smooth surface endless belt 95, drive motor 96, and a heating and drying unit 97.

The smooth surface endless belt 95 conveys the wet paper RP0 while heating and drying, and is specifically an endless belt of a smooth plate material of specified width connected and formed in an annular form of specified length.

The specified width is, same as in the mesh endless belt 45, slightly larger than the width dimension of the recycled paper RP to be manufactured. The plate material of smooth surface structure is a material capable of finishing one side of the wet paper RP0 in a proper smooth surface, and withstanding the heat of the heating and drying unit 97, and is preferably an elastic heat resistant material, such as fluoroplastics or stainless steel, and a fluoroplastic belt is used in the illustrated preferred embodiment. The specified length is long enough for heating and drying the wet paper RP0 to manufacture recycled paper RP as completed product, and is small enough to be contained in the accommodating space of the drying belt conveyor unit 42 in the apparatus case 5.

The smooth surface endless belt 95 is, as shown in FIG. 1 and FIG. 2, suspended and supported rotatably by way of drive roller 100, driven rollers 101, 102, press roll 71, slurry preventive roll 75, smooth surface finishing rolls 103, 103, and preliminarily dewatering roll 74, and is linked and driven by the drive motor 96 by way of the drive roller 100.

The drive motor 96 for driving the smooth surface endless belt 95 is used commonly as the driving source of the paper making net conveyor unit 40 and dewatering roll unit 41 as mentioned above, and the sharing structure, that is, the drive coupling mechanism is shown in FIG. 5.

In FIG. 5, reference numeral 105 is a power transmission gear, numeral 106 is a sprocket, numeral 107 is a power transmission chain stretched between sprockets 106, 106, and numeral 78 is a power transmission shaft.

The gear ratio of the power transmission gears 105, 105, . . . and sprockets 106, 106, . . . is determined so that all of drive roller 100, driven rollers 101, 102, press roll 71, slurry preventive roll 75, smooth surface finishing rolls 103, 103, and preliminarily dewatering roll 74 may roll and contact mutually at substantially same peripheral speed because the drive source is a single drive motor 96.

The heating and drying unit 97 is a location for heating and drying the wet paper RP0 on the smooth surface endless belt 95, and includes a heater plate 109 which is a heating unit disposed on the way of running route of the smooth surface endless belt 95.

The heater plate 109 in the illustrated preferred embodiment is provided in the horizontal running portion in the running route of the smooth surface endless belt 95, and is specifically disposed to contact slidably with the upper side of holding side of the wet paper RP0 and the opposite side or the lower side of the smooth surface endless belt 95. Hence, the wet paper RP0 on the smooth surface endless belt 95 is heated and dried indirectly by the smooth surface endless belt 95 heated by the heater plate 109.

In the running route of the smooth surface endless belt 95, two smooth surface finishing rolls 103, 103 are disposed. Specifically, these smooth surface finishing rolls 103, 103 are disposed parallel oppositely to the heater plate 109, in the horizontal running portion in the running route of the smooth surface endless belt 95.

The both smooth surface finishing rolls 103, 103 sequentially roll and press on the wet paper RP0 on the smooth surface endless belt 95, and finish the one side and opposite side of the wet paper RP0 contacting with the surface of the smooth surface endless belt 95 to a proper smooth surface.

In the illustrated preferred embodiment, two smooth surface finishing rolls 103, 103 are provided, but the number of smooth surface finishing rolls may be increased or decreased properly depending on the purpose.

At the downstream side of the heating and drying unit 97 of the smooth surface endless belt 95, a parting member 110 is provided. The parting member 110 is specifically an elastic spatula having a proper heat resistance, and the parting member 110 in the illustrated preferred embodiment is an elastic and deformable stainless steel plate of about 0.1 to 0.3 mm in thickness of which outer surface is coated with Teflon (registered trademark), and its base end is supported at the fixed side (not shown), and its leading end edge 110*a* is elastically fitted and fixed to the surface of the smooth surface endless belt 95.

The recycled paper RP heated and dried on the smooth surface endless belt 95 is sequentially parted from the holding side of the smooth surface endless belt 95 by the leading end edge 110*a* of the parting member 110.

In relation to this, at the downstream side of the parting member 110, that is, at end position of running route of the smooth surface endless belt 95, a cutter 111 is provided for cutting to a specified size. Specific structure of the cutter 111 is not shown, and may include, for example, a conventional two-side slitter, and guillotine cutter by solenoid.

The recycled paper RP parted from the smooth surface endless belt 95 is cut to specified size by the cutter 111 (vertical dimension of A4 size in the example), and recycled paper RP of proper size is discharged from a discharge port 112 of the apparatus case 5. For cutting in specified length, the belt feed rate of the smooth surface endless belt 95 is measured by a sensor such as proximity switch.

IV. Control Section 4

The control section 4 is for automatically controlling the actions of the drive units of the crushing section 6 and paper making section 3 in cooperation, and is specifically composed of microcomputer including CPU, ROM, RAM, and input and output ports.

The control section 4 stores programs for operating the pulp making process of the pulp making section 2 and paper making process of the paper making section in cooperation, and also stores information necessary for driving the individual parts, including the driving time of stirring device 8 in the crushing section 6, operation timing of water feeding device 9, running speed of conveyor units 40, 42 in the paper making section 3, driving time of heating and drying unit 97, and operation timing of the cutter 111, being entered preliminarily as data or selectively through keyboard.

Various units are electrically connected to the control section 4, such as float switches 18, 19, 30, 87, 88, and drive units 12, 16, 31, 46 (72, 96), 89, 105, 111, and the control section 4 controls the drive units 12, 16, 31, 46 (72, 96), 89, 105, 111 according to measured values and stored data.

The used paper recycling apparatus 1 having such configuration is started when the power is supplied, and the control units are automatically controlled by the control section 4 in mutual relation, and the following processes are executed. Used paper UP, UP, . . . charged in the used paper recycling apparatus 1 is crushed in the crushing section 6, and leak of confidential and personal information printed in the used paper UP is effectively prevented, and used paper pulp UPP is processed in the paper making section 3, and recycled paper RP is manufactured.

i) The heater plate 109 of the heating and drying unit 97 starts heating, and when heated to specified temperature, the specified temperature is maintained automatically thereafter.

ii) The crushing section 7 starts operation, and a specified volume of water W is supplied into the stirring tank 10 of the stirring device 8 from the water feeding device 9. The specified volume is a minimum required amount for crushing and beating the used paper UP, UP, . . . charged in the stirring tank 10 (about 3 liters in the illustrated preferred embodiment), and the water feed time of the water feeding pump 16 is controlled by a timer.

iii) Used paper UP, UP, . . . is charged from the inlet 10*a* of the stirring device 8 by a specified number of sheets (amount) determined from the processing capacity of the apparatus 1 (in the illustrated preferred embodiment, about 8 sheets of A4 format=about 32 g), and the start switch is turned on, then the stirring device 8 starts operation, and the stirring impeller 11 repeats normal and reverse rotation for specified time (3 to 5 minutes in the illustrated preferred embodiment) by the timer operation, so that the used paper UP, UP, . . . is crushed and beaten, and processed into used paper pulp UPP.

iv) By timer operation of stirring impeller 11 for specified time, the used paper UP, UP, . . . is processed into used paper pulp UPP, and then the beating section 7 starts operation, and the communication opening 20*b* of the beating tank 20 is opened, and the beater roller 21 starts rotation.

Consequently, the beating tank 20 and stirring tank 10 compose a pulp circulation cell, and the used paper pulp UPP crushed and beaten by the stirring impeller 11 flows into the beating tank 20, and flows in the rotating direction of the beater roller 21, and is beaten again in the crushing section 7, and circulated again into the stirring tank 20, and circulates again in the pulp circulation cells 10, 20, and is stirred and crushed by the crushing section 6 and beaten by the beating section 7 again for a specified time by timer operation (5 to 30 minutes in the illustrated preferred embodiment), so that the used paper pulp UPP is beaten until assuring enough paper strength for recycling of paper in the subsequent paper making section 3.

v) When the used paper pulp UPP is beaten sufficiently, operation of beating section 7 stops, and the drain valve of the stirring device 8 is opened, and the whole volume of used paper pulp UPP in the stirring tank 10 is discharged into the concentration adjusting tank 29.

In this case, also for the purpose of cleaning of stirring tank 10, in the midst of discharge of used paper pulp UPP, water is supplied into the stirring tank 10 from the water feeding device 9, and the stirring impeller 11 is rotated. The opening time of the discharge valve, supply of cleaning water, and rotation of stirring impeller 11 are sequentially controlled by the timer.

vi) Simultaneously with discharge and supply of used paper pulp UPP into the concentration adjusting tank 29 or after discharge and supply, white water W is supplied into the concentration adjusting tank 29 from the water feeding device for concentration adjustment 9. White water W is added and supplied until the float switch 30 in the concentration adjusting tank 29 detects the water level. By addition of white water W, the concentration of used paper pulp UPP is adjusted, and pulp suspension PS of specified concentration is prepared.

In the illustrated preferred embodiment, to the whole quantity of used paper pulp UPP (about 32 g of used paper UP+3 liters of water W), white water W is added until the water volume in the concentration adjusting tank 29 becomes 30 liters, that is, the total volume (whole amount) of used paper pulp UPP and water W becomes 30 liters, and hence the pulp suspension PS is adjusted to concentration of about 0.1%.

vii) The pulp suspension PS completed in concentration adjustment in the concentration adjusting tank 29 is almost entirely supplied into the pulp feeding tank 85 by operation of first suspension feeding pump 31 when the float switch 30 is turned on. This whole volume supply is also controlled by timer.

While the pulp suspension PS is being supplied into the pulp feeding tank 85, the water in the white water collecting tank 15 is not supplied into the concentration adjusting tank 29 (to prevent the adjusted concentration from changing).

viii) When the lower limit float switch 87 in the pulp feeding tank 85 (disposed corresponding to the water level of minimum water volume necessary for starting paper making process) is turned on, the drive motor 46 (72, 96) is driven, and the mesh endless belt 45 is driven to start paper making process, and the pulp suspension PS in the pulp feeding tank 85 is supplied into the overflow tank 81 of the pulp feeding tank 47 by the second suspension feeding pump 89.

In this case, for the portion of the time of sending of pulp suspension PS to the pulp feeding unit 47, the drive motor 46 (72, 96) is driven by a specified time lag, and the mesh endless belt 45 is delayed in operation.

The drive motor 46 (72, 96) is used not only for the mesh endless belt 45, but also used commonly as rotating and driving source of rolls 70, 71 of dewatering roll 41, running and driving source of smooth surface endless belt 95 of drying belt conveyor unit 42, and rotating and driving source of smooth surface finishing rolls 103, 103, and hence they are operated simultaneously in cooperation.

ix) The pulp suspension PS supplied in the overflow tank 81 overflows from the overflow tank 81, and flows down onto the flat plate member 82 of the partition member 79, and is uniformly diffused on the surface of the mesh endless belt 45 by retention action by cooperation of the main body frame 80 of the frame body 78 and the partition member 79. At the same time, by running action of the mesh endless belt 45, the diffused pulp suspension PS is conveyed as being dragged by the mesh endless belt 45 while maintaining the width dimension specified by the main body frame 80, and is filtered and dewatered by the mesh of the mesh endless belt 45, and wet paper RP0 is produced.

White water W filtered and dewatered by the mesh endless belt 45 is collected in the white water collecting tank 15 in the water feeding device 9, and is circulated and used again.

x) The wet paper RP0 conveyed together with the mesh endless belt 45 is converted from the inclined running state to horizontal running state at the preliminarily dewatering roll 74, and is further lightly dewatered by combined and synergistic effects by cooperation with moisture absorbing action of the preliminarily dewatering roll 74, and is held between the mesh endless belt 45 and smooth surface endless belt 95 by the pressing action of the slurry preventive roll 75, and sent into the dewatering roll unit 41.

xi) In the dewatering roll unit 41, by the pressing action of the slurry preventive roll 75, the wet paper RP0 held between the mesh endless belt 45 and smooth surface endless belt 95 passes between the dewatering roll 70 and press roll 71 while being rolled and squeezed flatly from the upper and lower sides by the both rolls 70, 71. As a result, the wet paper RP0 is dewatered to specified moisture content by the squeezing and dewatering mechanism shown in FIG. 6B, along with preliminary assisting action by the slurry preventive roll 75 as mentioned above.

xii) The wet paper RP0 squeezed and dewatered by the dewatering roll unit 41 is transferred and rolled on the upper side smooth surface endless belt 95 from the lower side mesh endless belt 45 at the downstream side position of the dewatering roll unit 41, and is conveyed this time together with the smooth surface endless belt 95, and heated and dried by the heater plate 109 of the drying belt conveyor unit 42, and recycled paper RP is manufactured.

At the same time, the wet paper RP0 or recycled paper RP is continuously rolled and pressed by two smooth surface finishing rolls 103, 103 disposed at the opposite side of the heater plate 109 against the smooth surface endless belt 95, and the side contacting with the surface of the smooth surface endless belt 95 and the opposite side surface are finished smoothly.

xiii) The recycled paper RP finished by the two smooth surface finishing rolls 103, 103 is affixed and held on the surface of the smooth surface endless belt 95, and is sequentially parted from the holding side of the smooth surface endless belt 95 by the leading end edge 110a of the parting member 110, and is cut to a specified size by the cutter 111, and the recycled paper RP of specified shape and size is discharged from the discharge port 112 of the apparatus case 5.

xiv) When the pulp suspension PS in the pulp feeding tank 85 decreases from the water level necessary for starting paper making process (almost empty state), the lower limit float switch 87 is turned off, and supply of pulp suspension PS by second suspension feeding pump 89 is stopped, and the drive motor 46 (72, 96) is also stopped, and the paper making process stops.

In this case, the drive motor 46 (72, 96) is stopped after a specified time lag for the portion of the time until the pulp suspension PS presently in the paper making process is completely discharged from the discharge port 112 as recycled paper RP.

xv) Thereafter, back to step iii), used paper UP, UP, . . . is charged by a specified number of sheets (amount) determined from the processing capacity of the apparatus 1 (in the illustrated preferred embodiment, about 8 sheets of A4 format=about 32 g), and the start switch is turned on again, and steps iv) to xiv) are repeated.

These steps show operations necessary for manufacturing recycled paper from used paper, and actual operation is protected by safety measures and other interlock controls.

Therefore, the used paper recycling apparatus 1 having such configuration brings about the following effects, and it can be installed not only in a big office but also in small shop or general household, and is friendly to the environment and low in running cost, and is capable of preventing leak of confidential information or private data, and assuring high confidentiality.

(1) A pulp making section 2 for crushing and beating used paper UP and making into pulp, a paper making section 3 for recycling paper by making used paper pulp UPP from the pulp making section 2, and a control section 4 for driving and controlling by interlocking the pulp making section 2 and paper making section 3 are incorporated in a furniture size apparatus case 5, and therefore the used paper UP can be recycled at the origin without being discarded, and the disposal is saved, and refuse problems are solved, and the limited resources can be utilized effectively.

In particular, recycling is not encouraged due to confidential problems, but when the used paper can be recycled at the origin, the effects of effective use of resources are tremendous.

(2) Since a compact used paper recycling apparatus having same function as large-scale plant is installed at the origin of used paper UP, paper can be used continuously repeatedly by recycling also at small shop or general household, and transportation and incineration cost of collection and disposal of used paper UP can be saved and it is very economical.

(3) The pulp making section 2 includes a crushing unit 6 for stirring and grinding the used paper UP, and a beating unit 7 for beating the crushed used paper UP from the crushing unit 6, and the crushing unit 6 and beating unit 7 are circulating the used paper pulp UPP, and therefore the used paper pulp UPP is beaten efficiently according to the purpose, and appropriate beating effects are obtained, and recycled paper RP of high quality is manufactured.

(4) By the pulp making section 2 for crushing and beating used paper UP to manufacture used paper pulp UPP, the used paper UP is decomposed into fibers, and printed characters and diagrams are not readable, and leak of confidential and personal information can be prevented, and high confidentiality is assured.

(5) Besides, the apparatus is compact and can be installed in a small space of office, shop or general household, and from this point of view, too, leak of confidential and personal information can be prevented.

(6) The water W used in the pulp making section 2 is circulated water W after dewatering and collecting in the paper making section 3, and the driving source of the pulp making section 2 and paper making section 3 is a drive source driven by general household alternating-current power source, and it is friendly to environment and low in running cost, and is hence economical.

(7) Being installed at the origin of used paper UP, the used paper UP is decomposed and transformed into used paper pulp UPP by the pulp making section 2, and the used paper pulp UPP is processed into recycled paper RP by the paper making section 3, and the used paper UP is used again as recycled paper RP at the origin, and therefore information of characters and diagrams printed in the used paper UP is not disclosed to outside of the origin, and leak of confidential and personal information is prevented securely, and high confidentiality is assured. At the same time, the resources can be utilized effectively.

By using the used paper recycling apparatus 1 of the preferred embodiment there is no risk of diffusion of information to outside of the origin (for example, school, hospital, city office, law office, patent office, general household).

In other words, in the case of conventional shredder, if the used paper is cut into small pieces and printed characters and diagrams are not readable, cut pieces of paper are collected and transported and disposed at the incinerator or the like, and hence diffusion to outside of the origin cannot be prevented completely. To prevent diffusion to outside, used paper may be stored in the own warehouse or the like, but such place of storage is needed, and the resources cannot be used again.

By contrast, according to the used paper recycling apparatus 1 of the preferred embodiment, information printed in used paper UP is not diffused outside of the origin, and the resources can be utilized effectively.

Preferred Embodiment 2

Figure 10:
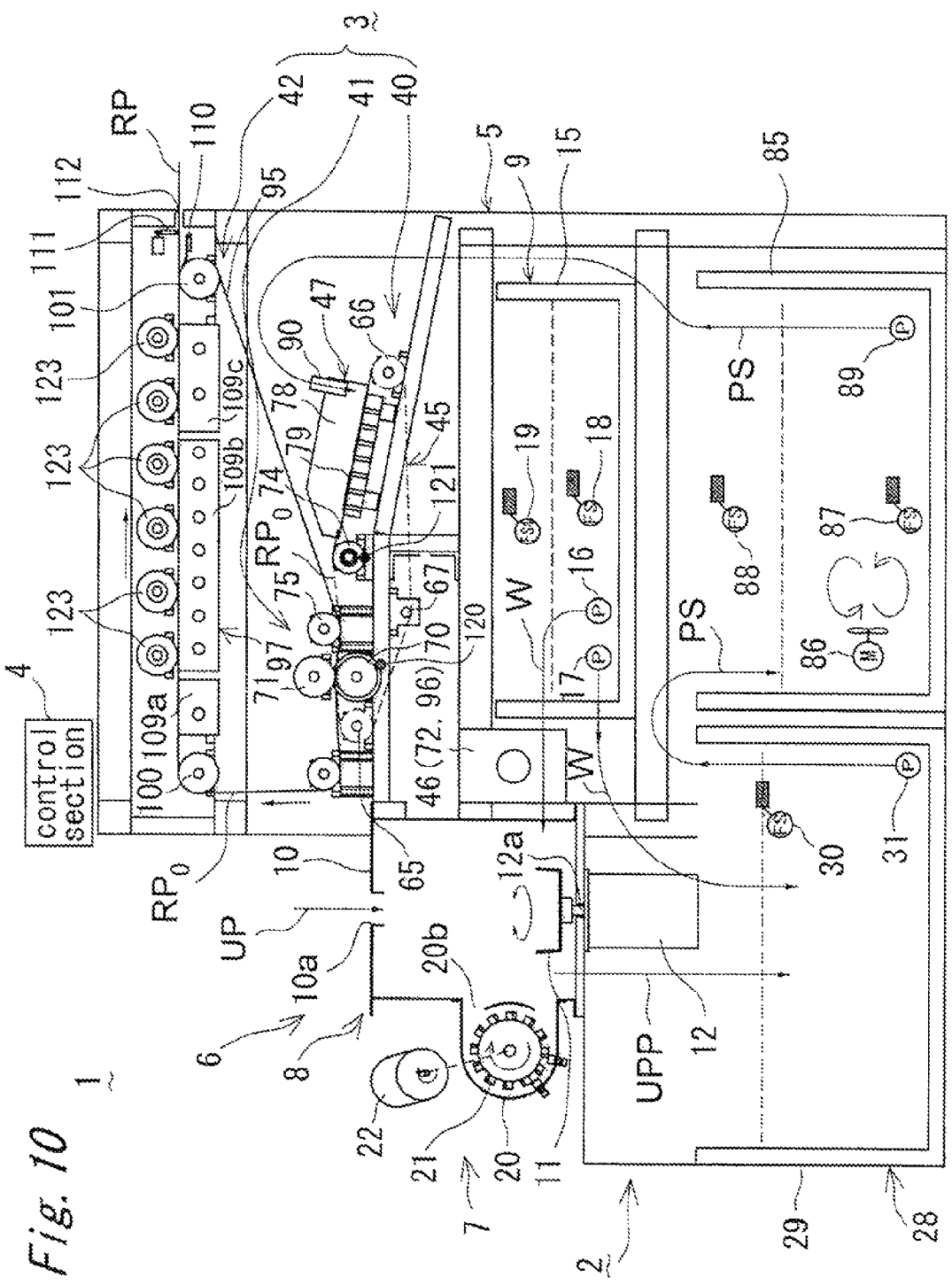
FIG. 10 is a front view of general structure of used paper recycling apparatus in preferred embodiment 2 of the invention, showing the apparatus case cut open.
Figure 11:
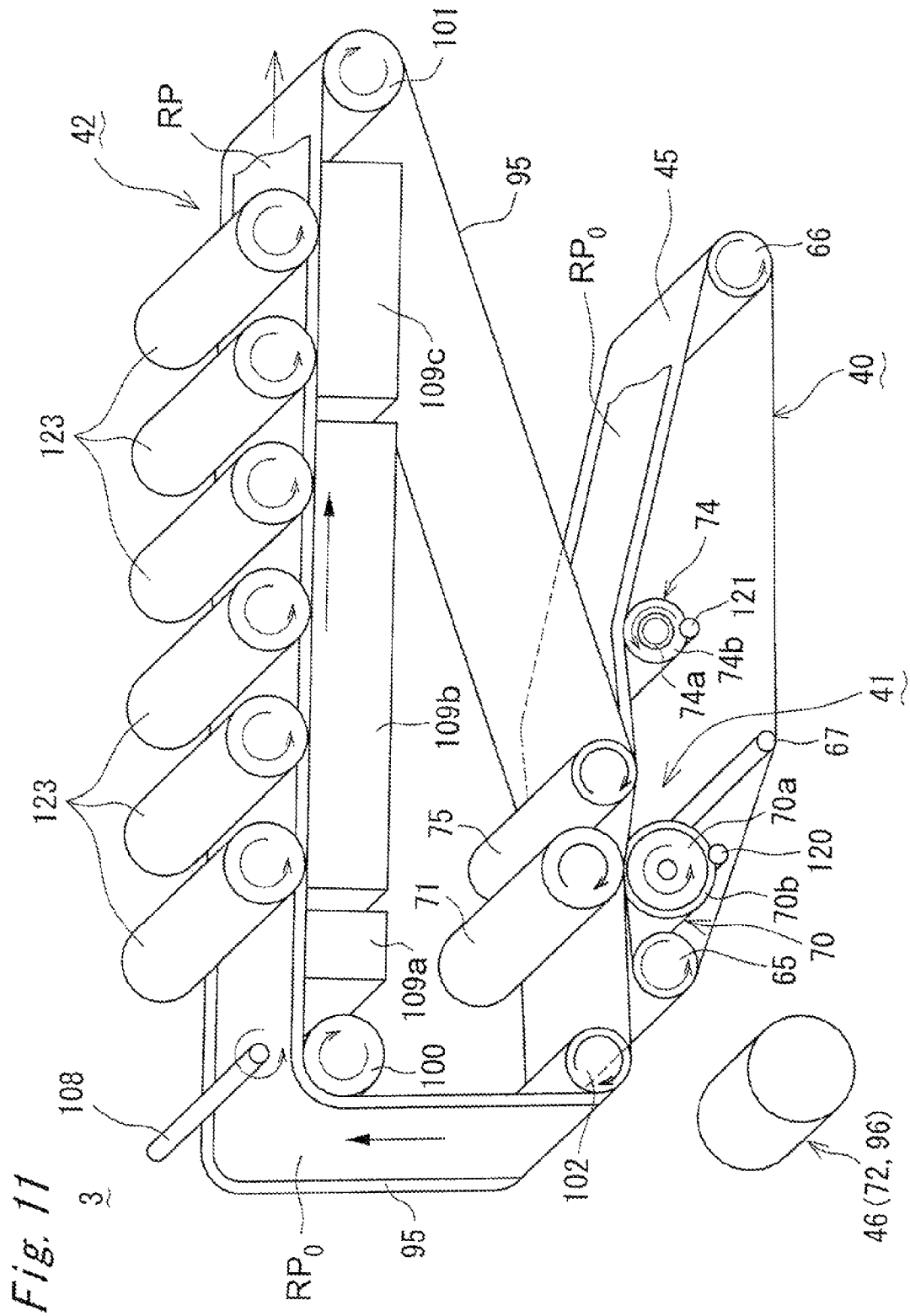
FIG. 11 is a perspective view of outline of paper making section of the used paper recycling apparatus.
Figure 12:
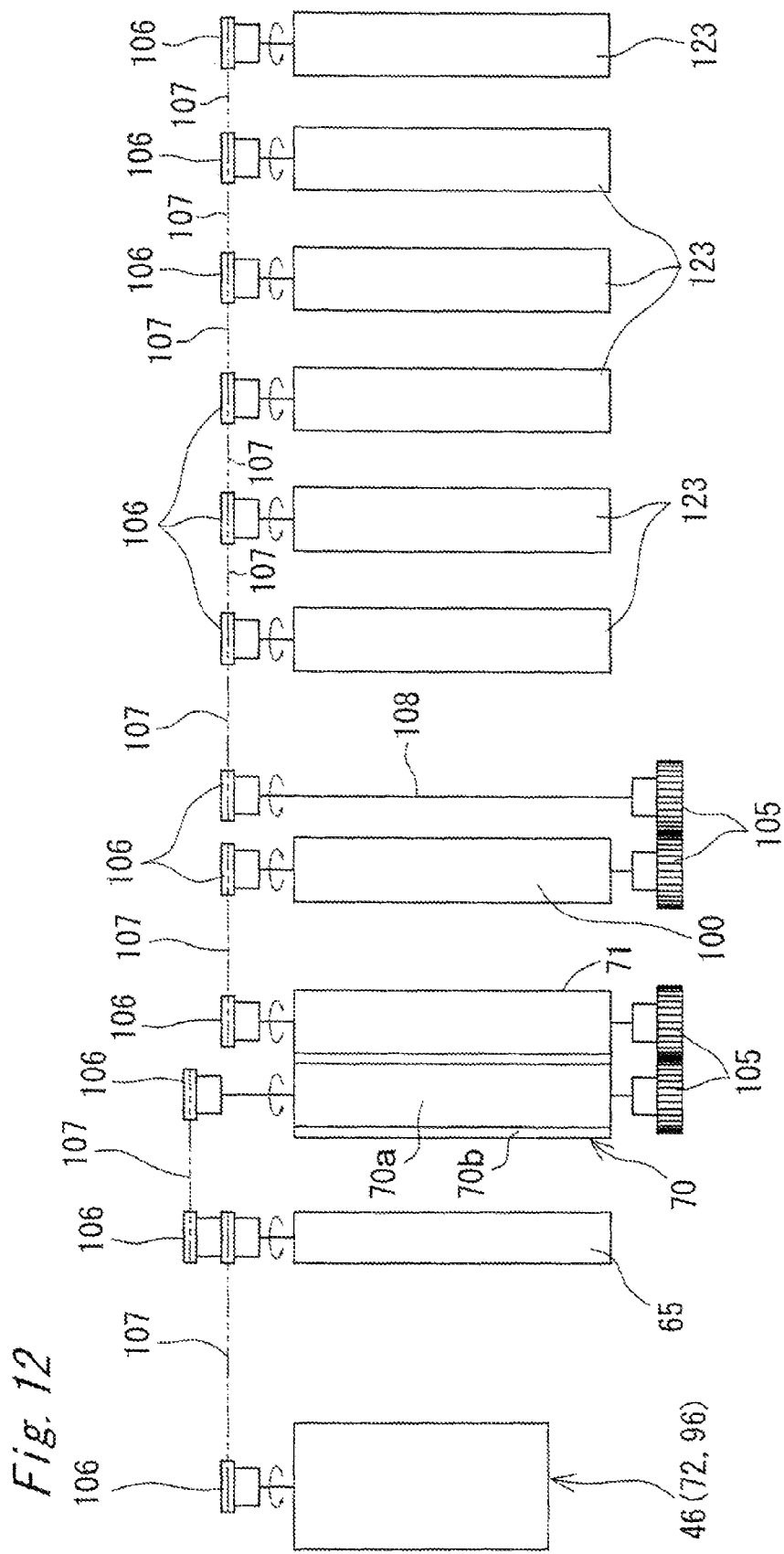
FIG. 12 is a plan view of drive linkage mechanism of the paper making section.

This Preferred embodiment is shown in FIG. 10 to FIG. 12, in which the used paper recycling apparatus 1 of preferred embodiment 1 is slightly modified.

That is, in the used paper recycling apparatus 1 of this preferred embodiment, the specific structure of the dewatering roll unit 41 and drying belt conveyor 42 in the paper making section 3 in preferred embodiment 1 is slightly modified.

The dewatering roll unit 41 of this preferred embodiment has dewatering roll 70 and press roll 71 as principal components, and includes preliminarily dewatering roll 74, slurry preventive roll 75, and drain roll 120 as auxiliary parts of drive motor 72.

The drain roll 120 is intended to squeeze and drain the moisture contained in the dewatering layer 70b of the dewatering roll 70, and it is a cylindrical roll of small diameter made of rigid material, and is pressed and rolled on the outer circumference of the dewatering roll 70.

Along with rotation of dewatering roll 70, the drain roll 120 rolls and squeezes the dewatering layer 70b of the dewatering roll 70, and the moisture absorbed in the dewatering layer 70b is squeezed and drained.

By such structure, if the well-beaten used paper pulp UPP is inferior in filtering and dewatering property and cannot be easily dewatered from the mesh endless belt 45, since the drain roll 120 is assisting the dewatering roll 70, the drain amount from the dewatering layer 70b is increased substantially, and the squeezing and dewatering action in the dewatering roll unit 41 can be further enhanced from preferred embodiment 1.

For the same purpose, in the illustrated preferred embodiment, the preliminarily dewatering roll 74 is also furnished with drain roll 121. The specific structure of drain roll 121 is same as that of drain roll 120.

The drying belt conveyor unit 42 is provided with a plurality of heater plates 109 for composing the heating and drying unit 97.

In this preferred embodiment, the heater plate 109 in preferred embodiment 1 is divided into three sections, and the heating temperature of these heater plates 109a, 109b, 109c can be controlled individually.

In the preferred embodiment, the number of smooth surface finishing rolls 123 disposed oppositely to the heater plates 109a, 109b, 109c is increased to six from two in preferred embodiment 1. These six smooth surface finishing rolls 123, 123, . . . are disposed parallel at small intervals oppositely to the entire surface of heater plates 109a, 109b, 109c.

Heaters are incorporated in the smooth surface finishing rolls 123 of the preferred embodiment, and they also function as heating rolls.

In the heating and drying unit 97 thus composed, the wet paper RP0 on the smooth surface endless belt 95 is heated and dried by the heater plates 109a, 109b, 109c, and depending on the moisture content of the wet paper RP0, the wet paper RP0 may be wound around the smooth surface finishing rolls 123, 123, . . . , but, for example, by the first heater plate 109a, it can be dried to such a moisture content as not to be wound around the smooth surface finishing rolls 123, 123, . . . .

After the next heater plates 109b, 109c, the wet paper RP0 is sequentially rolled and pressed from the upper side by the smooth surface finishing rolls 123, 123, . . . , and the wet paper RP0 is heated from surface and back sides by the smooth surface finishing rolls 123, 123, . . . , and the heater plates 109b, 109c, and the paper is dried to smooth surface on both sides without making creases.

In this configuration, as mentioned above, if the well-beaten used paper pulp UPP is inferior in filtering and dewatering property and cannot be easily dried by releasing vapor, creases, curl, wave, or distortion may be caused by vapor, such problems can be solved.

Other structure and action are same as in preferred embodiment 1.

Preferred Embodiment 3

Figure 13:
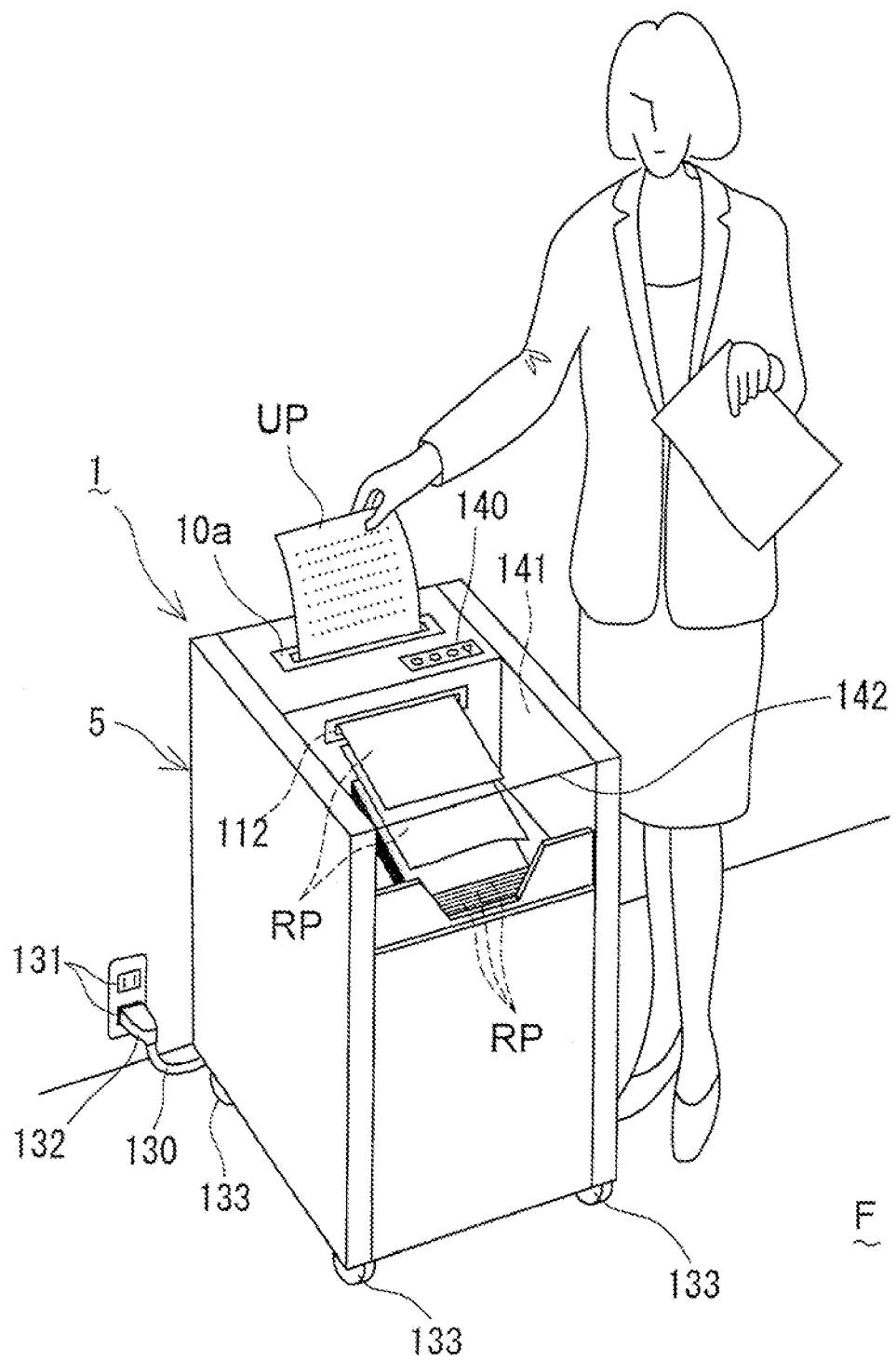
FIG. 13 is a perspective view of outline of used paper recycling apparatus in preferred embodiment 3 of the invention.
Figure 14:
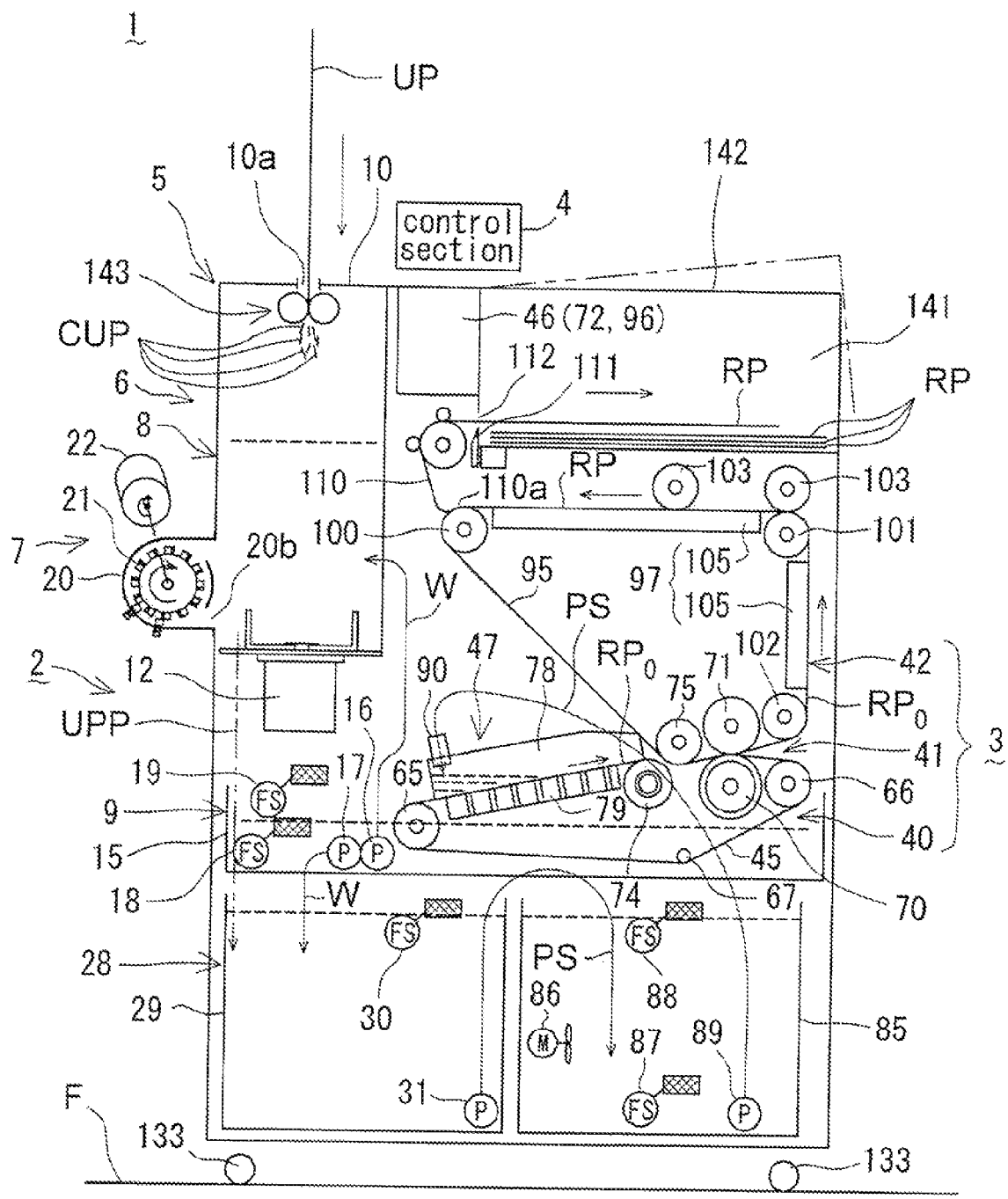
FIG. 14 is a cut-away front view of apparatus case in general structure of the used paper recycling apparatus.

This preferred embodiment is shown in FIG. 13 and FIG. 14, in which the used paper recycling apparatus 1 of preferred embodiment 1 is slightly modified.

The used paper recycling apparatus 1 of the embodiment has a compact appearance as shown in FIG. 13 that can be installed anywhere, including the business scene of government and private company offices, and the private scene of general household.

In the used paper recycling apparatus 1, the driving source of pulp making section 2 and paper making section 3 is a power source driven by alternating-current power source for general household same as in preferred embodiment 1, and as shown in FIG. 13, the leading end of the power cord 130 has a plug 132 to be inserted and connected to a wall power outlet 131 in office or home.

The apparatus case 5 is, as shown in FIG. 13, a nearly cubic box smaller than an office copier, and casters 133, 133, ... are provided in the bottom as moving means, and it is free to move on the floor F.

The top panel of the apparatus case 5 includes an inlet 10a for charging used paper UP, and an operation panel 140 including start button and operation buttons, and at the upper end front side, further, a recycled paper stock 141 is provided for piling recycled paper RP, RP, .... A discharge port 112 of apparatus case 5 is disposed oppositely to the recycled paper stock 141, and recycled paper RP, RP, ... discharged from the discharge port 112 is sequentially piled up in layers. A transparent protective cover 142 is put on the recycled paper stock 141 to be opened and closed from the upper side.

A shredder unit 143 is provided at the inlet 10a of the stirring tank 10. The shredder unit 143 is intended to improve the efficiency of crushing and beating by the stirring device 8 by preliminarily cutting the used paper UP, UP, ... charged into the inlet 10a.

A specific structure of shredder unit 143 is similar to conventional shredder, having a mechanism for cutting used paper UP into small pieces, and the cutting size of this cutting mechanism is determined to satisfy the following condition.

A conventional shredder is designed to cut to a very small size in order to prevent leak of confidential and personal information composed of characters and diagrams printed on the paper by cutting the until the characters and diagrams printed on the used paper UP are not recognized visually, but the main purpose of shredder unit 143 of the preferred embodiment is to a size so that the used paper pulp UPP manufactured from the cut used paper CUP, CUP, ... may have desired characteristic as material pulp for recycled paper RP to be manufactured in the next process of paper making section 3.

For this purpose, the cutting size of the cutting mechanism of the shredder unit 143 is set to such an extent that the paper fiber of cut used paper CUP may not be cut smaller than the size desired as material pulp for recycled paper RP. As far as this condition is satisfied, therefore, the specific structure of the cutting mechanism is not specified, and includes double cut type, cross cut type, and others.

When the used paper UP is charged from the inlet 10a, the used paper UP is preliminarily cut by the shredder unit 143 into cut used paper CUP, CUP, ... of specified size, and stirred for specified time in water W supplied from the water feeding device 9 by normal and reverse rotation of the stirring impeller 11 of the stirring device 8, and crushed and beaten, and used paper pulp UPP is prepared. This crushing and beating time is shorter than in preferred embodiment 1.

Specific structure and action of other components, that is, water feeding device 9 of crushing unit 6 and beating unit 7 of pulp making section 2, pulp concentration adjusting unit 28, paper making net conveyor unit 40, dewatering roll unit 41 and drying belt conveyor 42 of paper making section 3, and control section 4 are same as in preferred embodiment 1, except that the apparatus case 5 is reduced in size and is compact.

Preferred Embodiment 4

Figure 15:
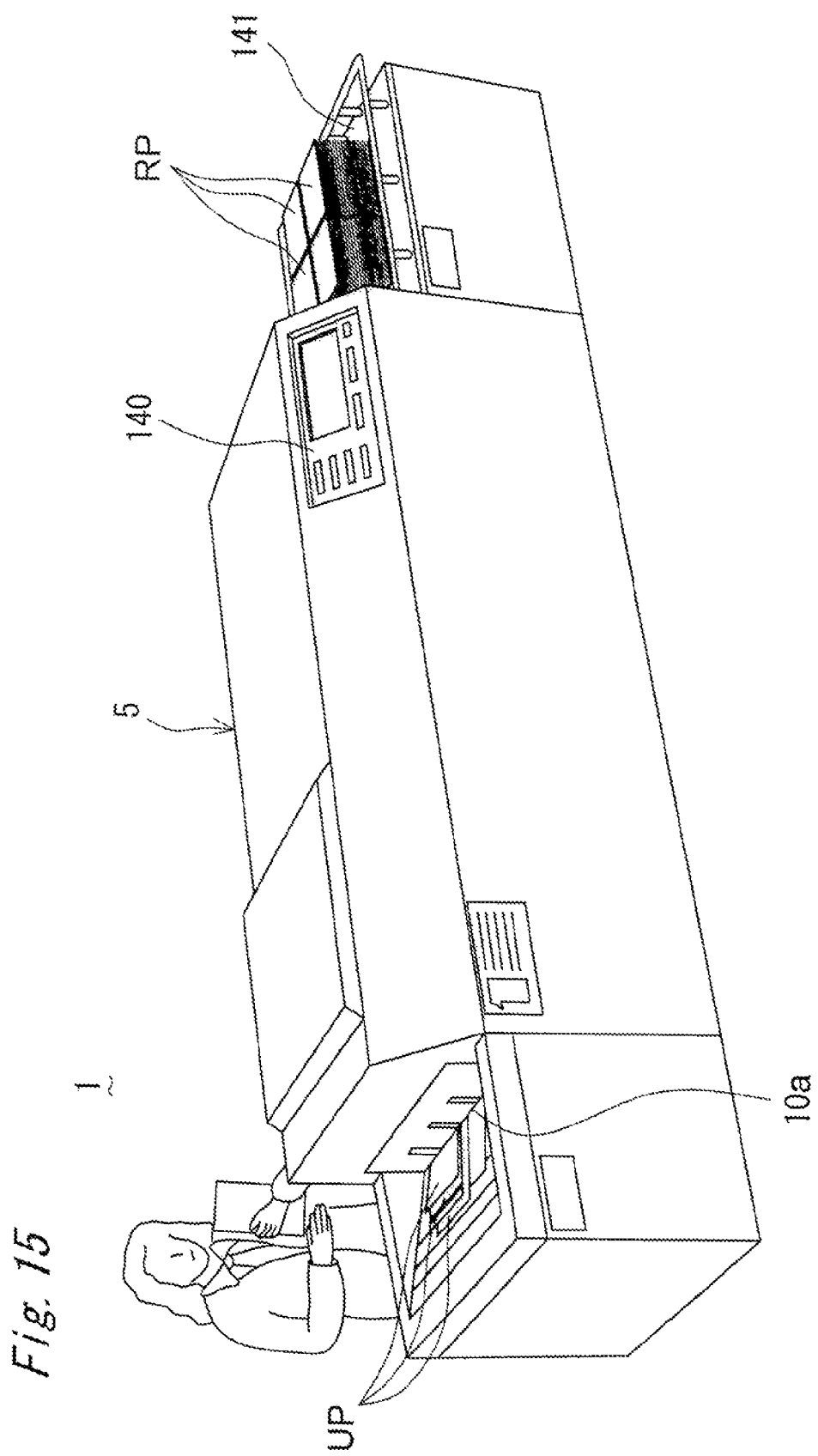
FIG. 15 is a perspective view of outline structure of used paper recycling apparatus in preferred embodiment 4 of the invention.

This preferred embodiment is shown in FIG. 15, in which the used paper recycling apparatus 1 of preferred embodiment 1 is slightly modified.

The used paper recycling apparatus 1 of the preferred embodiment has a large size to be installed in the business scene of special processing room in government and private company offices.

Specific structure of the used paper recycling apparatus 1 is not shown, but the components in preferred embodiment 1 to preferred embodiment 3 are increased in size or changed in layout, such as crushing unit 6 and beating unit 7 of pulp making section 2, pulp concentration adjusting unit 28, and paper making net conveyor unit 40, dewatering roll unit 41 and drying belt conveyor 42 of paper making section 3, and a larger amount of used paper UP, UP, ... can be processed.

In the used paper recycling apparatus 1 having such structure, where a wide space for installation is available, used paper UP, UP, ... can be charged into the inlet 10a in batch once a year or several times a year periodically, and can be processed sequentially and continuously in the pulp making section 2 and paper making section 3 in the apparatus case 5 as explained in preferred embodiment 1, and many sheets of recycled paper RP, RP, ... are continuously discharged from the discharge port (not shown) into the recycled paper stock 141, and these sheets of recycled paper RP, RP, ... are piled up in layers by manual work or filing mechanism (not shown) of the used paper recycling apparatus 1.

Preferred Embodiment 5

Figure 16:
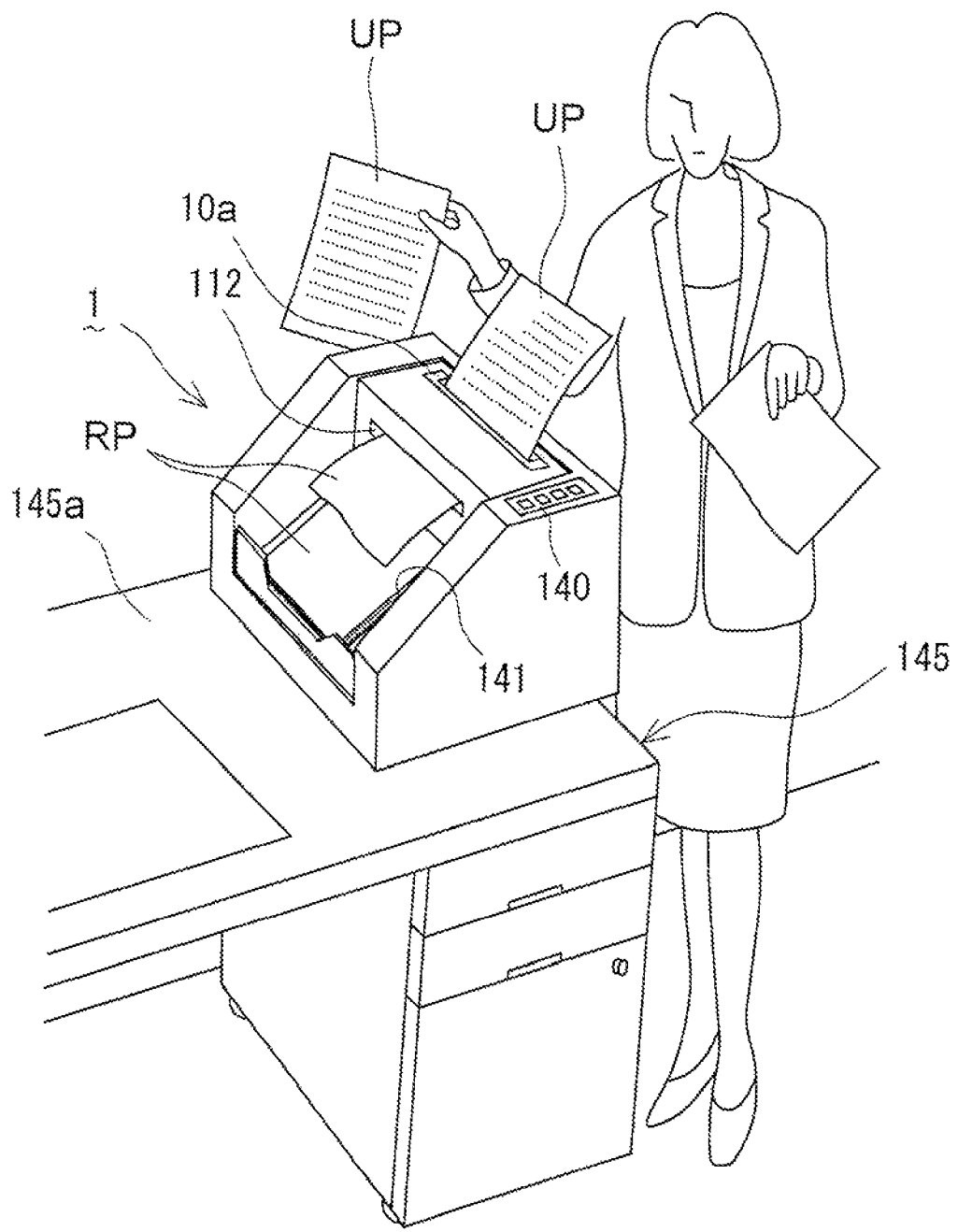
FIG. 16 is a perspective view of outline structure of used paper recycling apparatus in preferred embodiment 5 of the invention.

This preferred embodiment is shown in FIG. 16, in which the used paper recycling apparatus 1 of preferred embodiment 1 is slightly modified.

The used paper recycling apparatus 1 of the preferred embodiment has a small size of desktop type to be installed in the personal scene of small office or general household, at corner of top 145a of desk 145 or other narrow space.

Specific structure of the used paper recycling apparatus 1 is not shown as in preferred embodiment 4, but the components in preferred embodiment 1 to preferred embodiment 3 are decreased in size or simplified in function, such as crushing unit 6 and beating unit 7 of pulp making section 2, pulp concentration adjusting unit 28, and paper making net conveyor unit 40, dewatering roll unit 41 and drying belt conveyor 42 of paper making section 3, and it is suited to processing of a smaller amount of used paper UP, UP, ....

The used paper recycling apparatus 1 having such structure is installed on the desk 145 as shown in the example, and a small amount of used paper UP, UP, ... occurring in daily work or daily life is put in the inlet 10a sheet by sheet, and is sequentially and continuously processed in the pulp making section 2 and paper making section 3 in the apparatus case 5 as explained in preferred embodiment 1, and is discharged as recycled paper RP from the discharge port 112 sequentially in the recycled paper stock 141, and piled up in layers automatically.

Preferred embodiments 1 to 5 are preferred embodiments, but the invention is not limited to them alone, but may be changed and modified within its scope. For example, the invention may be modified as follows.

(1) In the illustrated preferred embodiments, the heater plate 109 is used as heating unit of the heating and drying unit 97, but instead of the heater plate 109, rotary heater roll, hot air heater, and other heating means may be used.

That is, although not shown specifically, when the heater roll is used as heating unit of heating and drying unit 97, for example, the heater roll is disposed to roll directly on the wet paper RP0 on the smooth surface endless belt 95, and the wet paper RP0 on the smooth surface endless belt 95 is directly heated and dried by the heater roll.

Or when the hot air heater is used as heating unit of heating and drying unit 97, for example, the hot air heater blows hot air to the wet paper RP0 on the smooth surface endless belt 95, and the wet paper RP0 on the smooth surface endless belt 95 is directly heated and dried by the hot air heater.

(2) In specific process by the control section 4, by changing the program, the process executed in preferred embodiment 1 (pulp making process by pulp making section 2 and paper making process by paper making section 3) may be changed to other process, and the design may be changed appropriately depending on the purpose or processing capacity.

As the invention may be embodied in several forms without departing from the spirit of essential characteristics thereof, the present preferred embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A pulp supply device incorporated in a used paper recycling apparatus of furniture size capable to be installed at an originating source of used paper, being a device for composing the pulp supply section of a paper making device for producing recycled paper by processing used paper pulp manufactured in a pulp making section in a preceding process, said pulp supply device comprising:
    a frame body and a partition member disposed at the upper and lower side positions of a running mesh endless belt disposed obliquely upward to the running direction,
    wherein the partition member is a louver structure slidably supporting the lower side of the mesh endless belt, and the flow-down supply position of pulp suspension at the base end side has a flat plate member for supporting the mesh of the mesh endless belt in closed state,
    wherein the frame body has a flat U-shaped main body frame opened at the leading end in the running direction side of the mesh endless belt,
    wherein the main body frame has its inner width set in the width size of the paper to be recycled, and defines the supply width of pulp suspension, and its lower end side slides on the upper side of the mesh endless belt, and
    wherein the pulp suspension supplied in the frame body from the pulp making section is diffused uniformly on the surface of the running, mesh endless belt with the supply width of pulp suspension by a retention action provided by cooperation of the main body frame of the frame body and the partition member.

2. The pulp supply device of used paper recycling apparatus of claim 1,
    wherein the frame body has an overflow tank provided at the rear end of the main body frame, and the pulp suspension supplied in the frame body is once stored in the overflow tank, and overflows, and flows down on the flat plate member of the partition member.

3. The pulp supply device of used paper recycling apparatus of claim 2,
    wherein the overflow tank is affixed integrally at the rear end of main body frame, and the upper end edge of front wall is formed horizontally and straightly, and the upper end edge of front wall of overflow tank function as overflow unit of pulp suspension.

4. A used paper recycling apparatus of furniture size capable to be installed at an originating source of used paper, incorporating a pulp supply device for composing the pulp supply section of a paper making device for producing recycled paper by processing used paper pulp manufactured in a pulp making section in a preceding process, said pulp supply device comprising:
    a frame body and a partition member disposed at the upper and lower side positions of a running mesh endless belt disposed obliquely upward to the running direction,
    wherein the partition member is a louver structure slidably supporting the lower side of the mesh endless belt, and the flow-down supply position of pulp suspension at the base end side has a flat plate member for supporting the mesh of the mesh endless belt in closed state,
    wherein the frame body has a flat U-shaped main body frame opened at the leading end in the running direction side of the mesh endless belt,
    wherein the main body frame has its inner width set in the width size of the paper to be recycled, and defines the supply width of pulp suspension, and its lower end side slides on the upper side of the mesh endless belt, and
    wherein the pulp suspension supplied in the frame body from the pulp making section is diffused uniformly on the surface of the running mesh endless belt with the supply width of pulp suspension by a retention action provided by cooperation of the main body frame of the frame body and the partition member.

5. The used paper recycling apparatus of claim 4, further comprising:
    a pulp feeding tank;
    suspension feeding piping arranged between the pulp feeding tank and the pulp supply device; and
    a suspension feeding pump configured to supply used paper pulp from the pulp feeding tank through the suspension feeding piping to the pulp supply device.

* * * * *